(12) United States Patent
Matsuoka

(10) Patent No.: US 11,994,196 B2
(45) Date of Patent: May 28, 2024

(54) DRIVE UNIT

(71) Applicant: EXEDY Corporation, Neyagawa (JP)

(72) Inventor: Yoshihiro Matsuoka, Neyagawa (JP)

(73) Assignee: EXEDY Corporation, Osaka (JP)

( * ) Notice: Subject to any disclaimer, the term of this patent is extended or adjusted under 35 U.S.C. 154(b) by 0 days.

(21) Appl. No.: 17/959,532

(22) Filed: Oct. 4, 2022

(65) Prior Publication Data

US 2023/0135283 A1 May 4, 2023

(30) Foreign Application Priority Data

Nov. 4, 2021 (JP) ................. 2021-180365

(51) Int. Cl.
*F16H 47/06* (2006.01)
*F16H 61/26* (2006.01)

(52) U.S. Cl.
CPC ............. *F16H 47/06* (2013.01); *F16H 61/26* (2013.01); *F16H 2200/0021* (2013.01); *F16H 2200/0034* (2013.01); *F16H 2200/0039* (2013.01); *F16H 2200/0086* (2013.01); *F16H 2200/0091* (2013.01)

(58) Field of Classification Search
CPC .. F16H 47/06; F16H 61/26; F16H 2200/0034; F16H 2200/0039; F16H 2200/0086; F16H 2200/0091; B60K 2001/001
See application file for complete search history.

(56) References Cited

U.S. PATENT DOCUMENTS

2004/0144576 A1* 7/2004 Hashimoto ............. F16H 3/089 903/905
2021/0079991 A1* 3/2021 Maurel ................. B60K 17/02

FOREIGN PATENT DOCUMENTS

| FR | 2434960 | * | 4/1980 |
| JP | 2001-287556 | * | 10/2001 |
| JP | 5370233 B2 | | 12/2013 |
| WO | WO 2013/168914 | * | 11/2013 |

OTHER PUBLICATIONS

Machine translation of JP 2001-287556, published Oct. 2001.*

* cited by examiner

*Primary Examiner* — William C Joyce
(74) *Attorney, Agent, or Firm* — United IP Counselors, LLC

(57) ABSTRACT

A drive unit includes an electric motor, first and second torque transmission paths, a torque converter, first and second gear trains, and a first switch mechanism. The first and second torque transmission paths are provided parallel to each other. The torque converter is disposed in the first torque transmission path. The torque converter amplifies a torque outputted from the motor when the torque is directed in a first rotational direction. The first gear train is disposed in the first torque transmission path. The first gear train is disposed downstream with respect to the torque converter. The second gear train is disposed in the second torque transmission path. The first switch mechanism switches between the first torque transmission path and the second torque transmission path as a path for transmitting the torque outputted from the motor.

19 Claims, 16 Drawing Sheets

DRIVE UNIT

CROSS-REFERENCE TO RELATED APPLICATIONS

This application claims priority to Japanese Patent Application No. 2021-180365 filed Nov. 4, 2021. The entire contents of that application are incorporated by reference herein in their entirety.

TECHNICAL FIELD

The present invention relates to a drive unit.

BACKGROUND ART

Electric cars travel using an electric motor as a drive source. The electric cars move forward by forwardly rotating the electric motor and move backward by reversely rotating the electric motor. There has been proposed a type of electric car in which a torque converter is installed in order to amplify a torque outputted from the electric motor (e.g., Publication of Japan Patent No. 5370233).

It has been demanded that torque transmission is made efficiently in the electric car configured as described above. In view of this, it is an object of the present invention to provide a drive unit whereby torque transmission can be made efficiently.

BRIEF SUMMARY

A drive unit according to an aspect of the present invention includes an electric motor, a first torque transmission path, a second torque transmission path, a torque converter, a first gear train, a second gear train, and a first switch mechanism. The first torque transmission path is configured to transmit a torque outputted from the electric motor to an output unit. The second torque transmission path is provided parallel to the first torque transmission path. The second torque transmission path is configured to transmit the torque outputted from the electric motor to the output unit. The torque converter is disposed in the first torque transmission path. The torque converter is configured to amplify the torque outputted from the electric motor when the torque is directed in the first rotational direction. The first gear train is disposed in the first torque transmission path. The first gear train is disposed downstream with respect to the torque converter. The second gear train is disposed in the second torque transmission path. The first switch mechanism is configured to switch between the first torque transmission path and the second torque transmission path as a path for transmitting the torque outputted from the electric motor.

According to this configuration, when rotation of the torque converter is not required (e.g., when the electric motor is rotated in a second rotational direction), the path for transmission the torque outputted from the electric motor can be switched to the second torque transmission path by the first switch mechanism. Thus, when rotation of the torque converter is not required, torque transmission can be made without through the torque converter; hence, torque transmission can be made efficiently.

The second gear train can be made higher in reduction ratio than the first gear train.

The first gear train can be made higher in reduction ratio than the second gear train.

Preferably, the drive unit further includes a controller. The controller controls the electric motor and the first switch mechanism.

Preferably, the controller executes a first reverse moving mode. When executing the first reverse moving mode, the controller controls and causes the electric motor to be rotated in a second rotational direction. Besides, when executing the first reverse moving mode, the controller controls the first switch mechanism such that transmission of the torque outputted from the electric motor is made through the second torque transmission path.

Preferably, the controller executes a first forward moving mode. When executing the first forward moving mode, the controller controls and causes the electric motor to be rotated in the first rotational direction. Besides, when executing the first forward moving mode, the controller controls the first switch mechanism such that transmission of the torque outputted from the electric motor is made through the first torque transmission path.

Preferably, the controller executes a second forward moving mode. When executing the second forward moving mode, the controller controls and causes the electric motor to be rotated in the first rotational direction. Besides, when executing the second forward moving mode, the controller controls the first switch mechanism such that transmission of the torque outputted from the electric motor is made through the second torque transmission path.

Preferably, the drive unit further includes a third gear train and a second switch mechanism. The third gear train is disposed in the first torque transmission path. The third gear train is configured to receive the torque transmitted thereto from the torque converter. The second switch mechanism is configured to switch between the first gear train and the third gear train as the path for transmitting the torque after the torque is outputted from the torque converter. The controller controls the second switch mechanism.

Preferably, the third gear train is configured to output the torque in a reverse rotational direction to when the torque is outputted from the first gear train.

Preferably, the second switch mechanism is settable to a neutral position without selecting both the first and third gear trains so as to block transmission of the torque outputted from the torque converter.

Preferably, the controller controls and causes the second switch mechanism to be set to the neutral position when executing the second forward moving mode.

Preferably, the drive unit further includes a first clutch. The torque converter includes an input part and an output part. The input part is configured to receive the torque inputted thereto after the torque is outputted from the electric motor. The output part is configured to receive the torque transmitted thereto from the input part through a fluid. The first clutch is configured to allow and block transmission of the torque between the input part and the output part.

Preferably, the first clutch is a one-way clutch. The first clutch is configured to allow transmission of the torque outputted from the electric motor when the torque is directed in the second rotational direction and block transmission of the torque outputted from the electric motor when the torque is directed in the first rotational direction.

Preferably, the drive unit further includes a second clutch. The second clutch is disposed downstream with respect to the torque converter in the first torque transmission path. The second clutch is configured to allow and block transmission of the torque.

Preferably, the second clutch is a one-way clutch. The second clutch is configured to allow transmission of the torque outputted from the torque converter to a downstream side and block transmission of the torque from the downstream side to the torque converter.

Preferably, the drive unit further includes a fourth gear train. The fourth gear train is disposed upstream with respect to the torque converter in the first torque transmission path.

Preferably, the drive unit further includes a third torque transmission path and a third switch mechanism. The third torque transmission path branches off from the first torque transmission path at a position upstream of the torque converter and merges to the first torque transmission path at a position downstream of the torque converter. The third switch mechanism is configured to switch between the first torque transmission path and the third torque transmission path as the path for transmitting the torque.

Preferably, the torque converter includes a centrifugal lock-up clutch.

Preferably, the first switch mechanism includes a first torque output part, a first torque input part, a second torque input part, and a coupling part. The first torque output part is configured to output the torque outputted from the electric motor. The first torque input part is disposed in the first torque transmission path. The first torque input part is configured to receive the torque inputted thereto after the torque is outputted from the first torque output part. The second torque input part is disposed in the second torque transmission path. The second torque input part is configured to receive the torque inputted thereto after the torque is outputted from the first torque output part. The coupling part is settable to a first coupling state and a second coupling state. When set to the first coupling state, the coupling part couples the first torque output part and the first torque input part therethrough. When set to the second coupling state, the coupling part couples the first torque output part and the second torque input part therethrough.

The first torque output part, the first torque input part, and the second torque input part can be disposed along a rotational axis of the electric motor so as to be aligned from a side closer to the electric motor in an order of the first torque output part, the first torque input part, and the second torque input part.

The first torque output part, the first torque input part, and the second torque input part can be disposed along the rotational axis of the electric motor so as to be aligned from the side closer to the electric motor in an order of the second torque input part, the first torque output part, and the first torque input part.

The first torque output part, the first torque input part, and the second torque input part can be disposed along the rotational axis of the electric motor so as to be aligned from the side closer to the electric motor in an order of the first torque output part, the second torque input part, and the first torque input part.

Overall, according to the present invention, torque transmission can be made efficiently.

DETAILED DESCRIPTION

Figure 1:
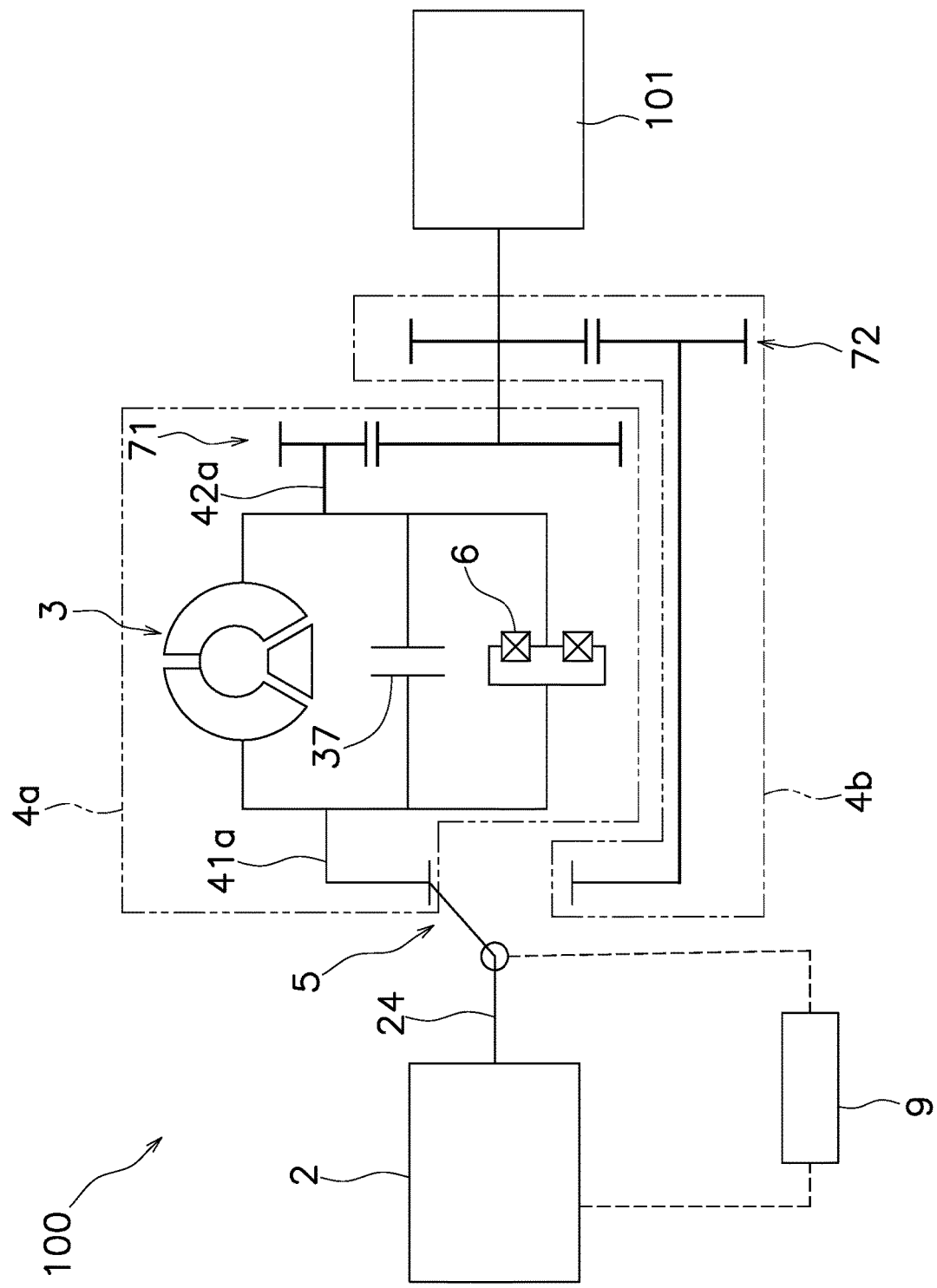
FIG. 1 is a block diagram showing torque transmission paths in a drive unit.
Figure 2:
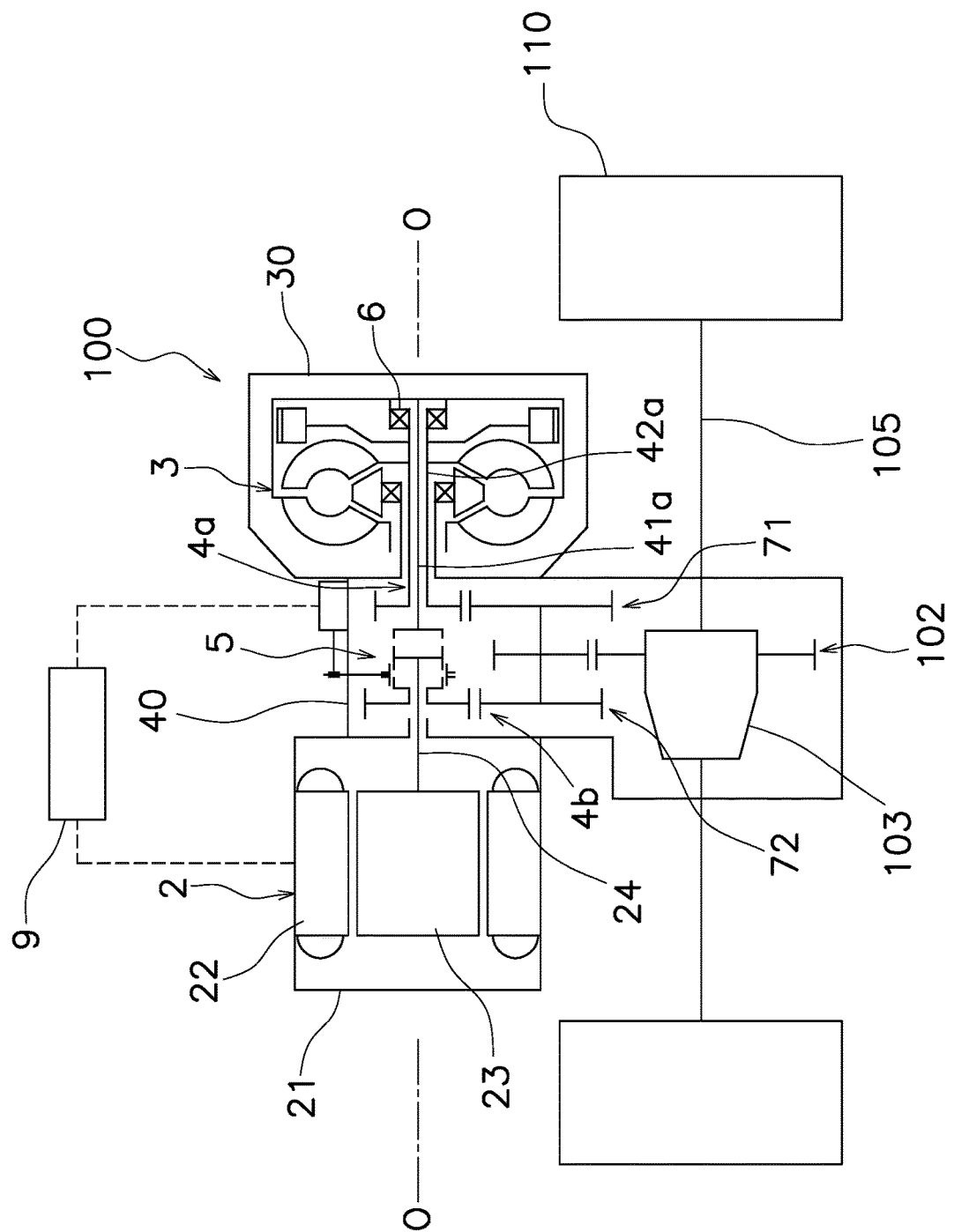
FIG. 2 is a schematic diagram of the drive unit.

A drive unit according to the present preferred embodiment will be hereinafter explained with reference to drawings. FIG. 1 is a block diagram showing torque transmission paths in the drive unit, whereas FIG. 2 is a schematic diagram of the drive unit. It should be noted that in the following explanation, the term "axial direction" refers to an extending direction of a rotational axis O for both an electric motor 2 and a torque converter 3. On the other hand, the term "circumferential direction" refers to a circumferential direction of an imaginary circle about the rotational axis O, whereas the term "radial direction" refers to a radial direction of the imaginary circle about the rotational axis O. Besides, the term "upstream" and "downstream" mean an upstream side and a downstream side in a direction of transmitting a torque.

[Drive Unit]

As shown in FIGS. 1 and 2, the drive unit (100) is configured to drive an output unit 101. The output unit 101 includes a final gear train 102, a differential gear 103, a pair of drive shafts 105, and a pair of drive wheels 110. It should be noted that the output unit 101 can include only the drive wheels 110.

The pair of drive shafts 105 extends from the differential gear 103 to the pair of drive wheels 110, respectively. The pair of drive shafts 105 extends parallel to the rotational axis O. When described in detail, the pair of drive shafts 105 extends parallel to first and second torque transmission shafts 41a and 42a (to be described). Besides, the pair of drive shafts 105 extends to be offset (displaced) from the first and second torque transmission shafts 41a and 42a.

The differential gear 103 is disposed in the middle of the space between the pair of drive wheels 110 in the extending direction of the pair of drive shafts 105. In other words, the pair of drive shafts 105 is substantially equal in length to each other.

The drive unit 100 includes the electric motor 2, the torque converter 3, first and second torque transmission paths 4a and 4b, a first switch mechanism 5, a first clutch 6, a first gear train 71, a second gear train 72, and a controller 9. The drive unit 100 is installed in, for instance, an electric car.

<Electric Motor>

The electric motor 2 (hereinafter simply referred to as "motor") includes a motor casing 21, a stator 22, a rotor 23, and an output shaft 24. In the present preferred embodiment, the motor 2 is a so-called inner rotor motor. The motor 2 is configured to be rotatable in a first rotational direction and a second rotational direction. It should be noted that the second rotational direction is a rotational direction reverse to the first rotational direction.

The motor casing 21 is non-rotatable, while being fixed to a body frame of the vehicle or so forth. The stator 22 is fixed to the inner peripheral surface of the motor casing 21. The stator 22 is non-rotatable. The rotor 23 is rotated about the rotational axis O. The rotor 23 is disposed radially inside the stator 22. The output shaft 24 extends from the rotor 23 in the axial direction. The output shaft 24 is unitarily rotated with the rotor 23.

<First and Second Torque Transmission Paths>

As shown in FIG. 1, the first and second torque transmission paths 4a and 4b are configured to transmit a torque, outputted from the motor 2, to the output unit 101. Besides, the first and second torque transmission paths 4a and 4b are provided parallel to each other.

The first torque transmission path 4a includes the first and second torque transmission shafts 41a and 42a. As shown in FIG. 2, the torque, outputted from the motor 2, is inputted to the first torque transmission shaft 41a through the first switch mechanism 5. The first torque transmission shaft 41a extends in the axial direction. The first torque transmission shaft 41a extends to be coaxial to the output shaft 24 of the motor 2. The first torque transmission shaft 41a extends toward the torque converter 3. The rotational axis of the first torque transmission shaft 41a is substantially matched with that of the motor 2 and that of the torque converter 3.

The first torque transmission shaft 41a transmits the torque, outputted from the motor 2, to the torque converter 3. The first torque transmission shaft 41a is attached at the downstream-side end thereof (the right-side end thereof in FIG. 2) to a cover hub 313 (see FIG. 5) of the torque converter 3. The first torque transmission shaft 41a is solid.

The second torque transmission shaft 42a receives the torque inputted thereto from the torque converter 3. The second torque transmission shaft 42a outputs the torque, inputted thereto from the torque converter 3, to the first gear train 71. The second torque transmission shaft 42a extends axially toward the motor 2 from the torque converter 3.

The second torque transmission shaft 42a has a cylindrical shape. The first torque transmission shaft 41a extends through the interior of the second torque transmission shaft 42a. The second torque transmission shaft 42a is attached at the upstream-side end thereof (the right-side end thereof in FIG. 2) to a turbine 33 (see FIG. 5) of the torque converter 3. On the other hand, the second torque transmission shaft 42a is rotatably supported at the downstream-side end thereof (the left-side end thereof in FIG. 2) by, for instance, a transmission casing 40 or so forth through a bearing member and/or so forth.

The second torque transmission path 4b is configured to transmit the torque, outputted from the motor 2, to the output unit 101 without the torque passing through the torque converter 3.

<First Switch Mechanism>

The first switch mechanism 5 is configured to switch between the first torque transmission path 4a and the second torque transmission path 4b as a path for transmitting the torque outputted from the motor 2. It should be noted that the first switch mechanism 5 is controlled by the controller 9. The first switch mechanism 5 is disposed in the interior of the transmission casing 40.

Figure 3:
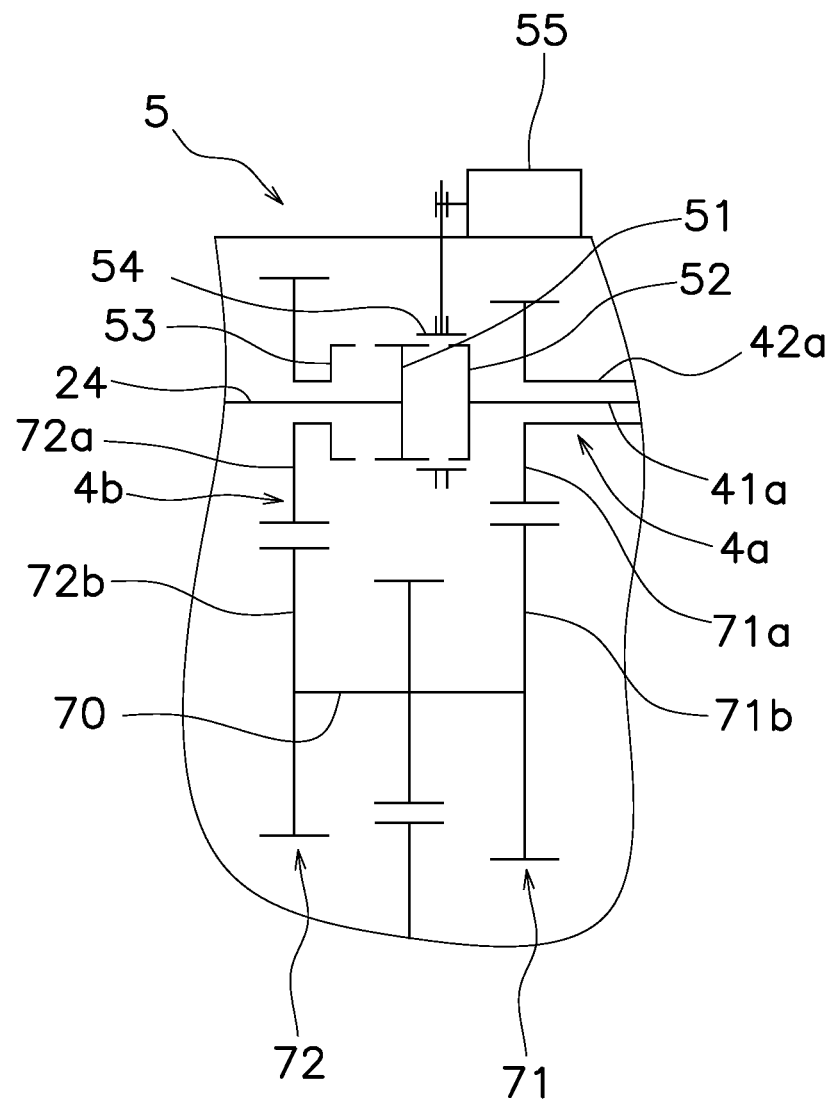
FIG. 3 is a closeup view of a first switch mechanism and the periphery thereof.
Figure 4:
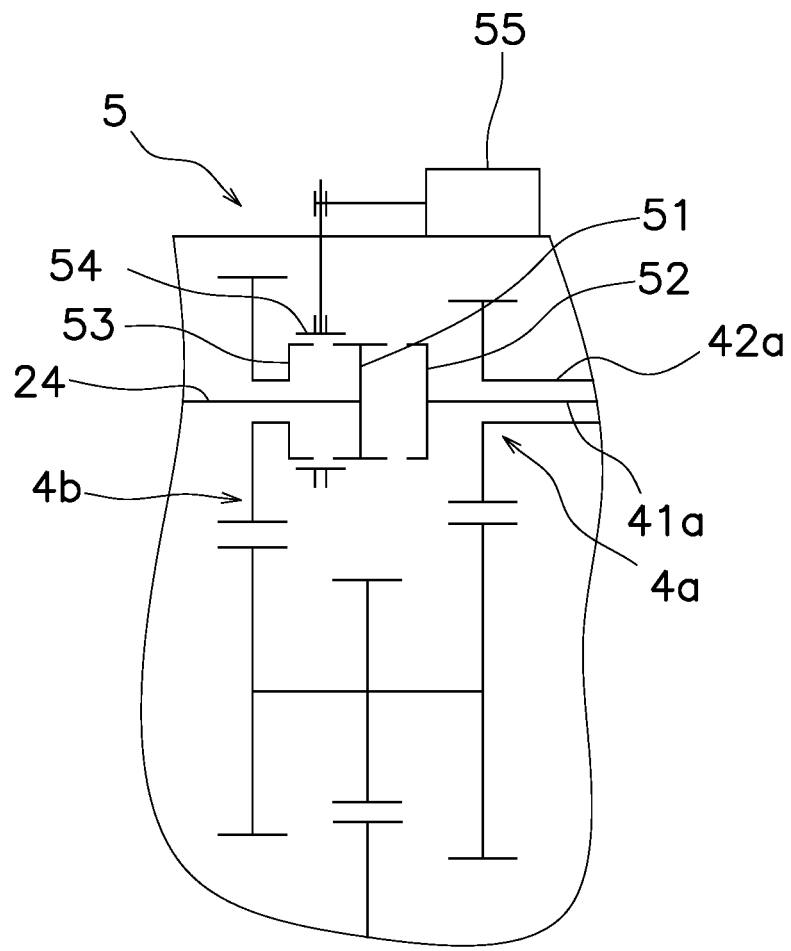
FIG. 4 is a closeup view of the first switch mechanism and the periphery thereof.

As shown in FIGS. 3 and 4, the first switch mechanism 5 includes a first torque output gear 51 (exemplary first torque output part), a first torque input gear 52 (exemplary first torque input part), a second torque input gear 53 (exemplary second torque input part), and a first ring gear 54 (exemplary coupling part). Besides, the first switch mechanism 5 further includes an actuator 55 causing the first ring gear 54 to move in the axial direction. The actuator 55 is controlled by the controller 9.

The first torque output gear 51 is configured to output the torque, outputted from the motor 2, to the first or second torque transmission path 4a, 4b. The first torque output gear 51 is attached to the distal end of the output shaft 24. The first torque output gear 51 is unitarily rotated with the output shaft 24. The first torque output gear 51 can be provided as a different member separated from the output shaft 24, or alternatively, can be provided as a single member integrated with the output shaft 24. The first torque output gear 51 is disposed to be rotatable about the rotational axis O. The first torque output gear 51 includes a plurality of teeth on the outer peripheral surface thereof.

The first torque input gear 52 is disposed in the first torque transmission path 4a. The first torque input gear 52 is configured to receive the torque that is inputted thereto after outputted from the first torque output gear 51. The first torque input gear 52 is disposed to be rotatable about the rotational axis O.

The first torque input gear 52 is attached to the first torque transmission shaft 41a. When described in detail, the first torque input gear 52 is attached to the upstream-side end (the left-side end in FIG. 3) of the first torque transmission shaft 41a. The first torque input gear 52 is unitarily rotated with the first torque transmission shaft 41a. The first torque input gear 52 can be provided as a different member separated from the first torque transmission shaft 41a, or alternatively, can be provided as a single member integrated with the first torque transmission shaft 41a. The first torque input gear 52 is approximately equal in diameter to the first torque output gear 51. The first torque input gear 52 includes a plurality of teeth on the outer peripheral surface thereof.

The second torque input gear 53 is disposed in the second torque transmission path 4b. The second torque input gear 53 is configured to receive the torque that is inputted thereto after outputted from the first torque output gear 51. The second torque input gear 53 is disposed to be rotatable about the rotational axis O. The second torque input gear 53 is approximately equal in diameter to the first torque output gear 51. The second torque input gear 53 includes a plurality of teeth on the outer peripheral surface thereof. The second torque input gear 53 is supported by the output shaft 24, while being rotatable relative thereto.

The first torque output gear 51 is disposed axially between the first and second torque input gears 52 and 53. The second torque input gear 53, the first torque output gear 51, and the first torque input gear 52 are disposed along the rotational axis O, while being aligned in this order from a side closer to the motor 2. The first torque output gear 51, the first torque input gear 52, and the second torque input gear 53 are disposed to be rotatable relative to each other.

The first ring gear 54 includes a plurality of teeth on the inner peripheral surface thereof. The first ring gear 54 is constantly meshed with the first torque output gear 51 and is unitarily rotated therewith. In other words, the first ring gear 54 is unitarily rotated with the output shaft 24.

The first ring gear 54 is disposed to be movable in the axial direction. When controlled by the controller 9, the first ring gear 54 is moved in the axial direction. When described in detail, as described above, the actuator 55, controlled by the controller 9, causes the first ring gear 54 to move in the axial direction. When moved in the axial direction, the first ring gear 54 is settable to a first coupling state and a second coupling state. It should be noted that FIG. 3 shows the first ring gear 54 set to the first coupling state, whereas FIG. 4 shows the first ring gear 54 set to the second coupling state.

As shown in FIG. 3, when set to the first coupling state, the first ring gear 54 couples the first torque output gear 51 and the first torque input gear 52 therethrough. When described in detail, the first ring gear 54 is meshed with the first torque output gear 51, while being meshed with the first torque input gear 52.

When the first ring gear 54 is thus meshed with both the first torque output gear 51 and the first torque input gear 52, the first torque output gear 51 and the first torque input gear 52 are coupled to be unitarily rotated with each other. In other words, the output shaft 24 and the first torque transmission shaft 41a are unitarily rotated with each other. As a result, the first switch mechanism 5 can set the first torque transmission path 4a as the path for transmitting the torque outputted from the motor 2. It should be noted that when the first ring gear 54 is set to the first coupling state, the torque outputted from the motor 2 is not transmitted to the second torque transmission path 4b.

As shown in FIG. 4, when set to the second coupling state, the first ring gear 54 couples the first torque output gear 51 and the second torque input gear 53 therethrough. When described in detail, the first ring gear 54 is meshed with the first torque output gear 51, while being meshed with the second torque input gear 53.

When the first ring gear 54 is thus meshed with both the first torque output gear 51 and the second torque input gear 53, the first torque output gear 51 and the second torque input gear 53 are coupled to be unitarily rotated with each other. In other words, the output shaft 24 and the second torque input gear 53 are unitarily rotated with each other. As a result, the first switch mechanism 5 can set the second torque transmission path 4b as the path for transmitting the torque outputted from the motor 2. It should be noted that when the first ring gear 54 is set to the second coupling state, the torque outputted from the motor 2 is not transmitted to the first torque transmission path 4a.

<Torque Converter>

As shown in FIG. 1, the torque converter 3 is disposed in the first torque transmission path 4a. The torque converter 3 is configured to amplify the torque outputted from the motor 2 when the torque is directed in the first rotational direction. It should be noted that when directed in the second rotational direction, the torque outputted from the motor 2 is not amplified by the torque converter 3. The torque converter 3 output the amplified torque to the first gear train 71.

As shown in FIG. 2, the rotational axis O of the torque converter 3 is substantially matched with that of the motor 2. When torque transmission is made through the first torque transmission path 4a by the first switch mechanism 5, the torque outputted from the motor 2 is transmitted to the torque converter 3. The torque converter 3 is disposed axially apart from the motor 2 at an interval.

The first switch mechanism 5 is disposed between the torque converter 3 and the motor 2. The motor 2, the first switch mechanism 5, and the torque converter 3 are axially aligned in this order. Besides, the first and second gear trains 71 and 72 are also disposed between the torque converter 3 and the motor 2.

Figure 5:
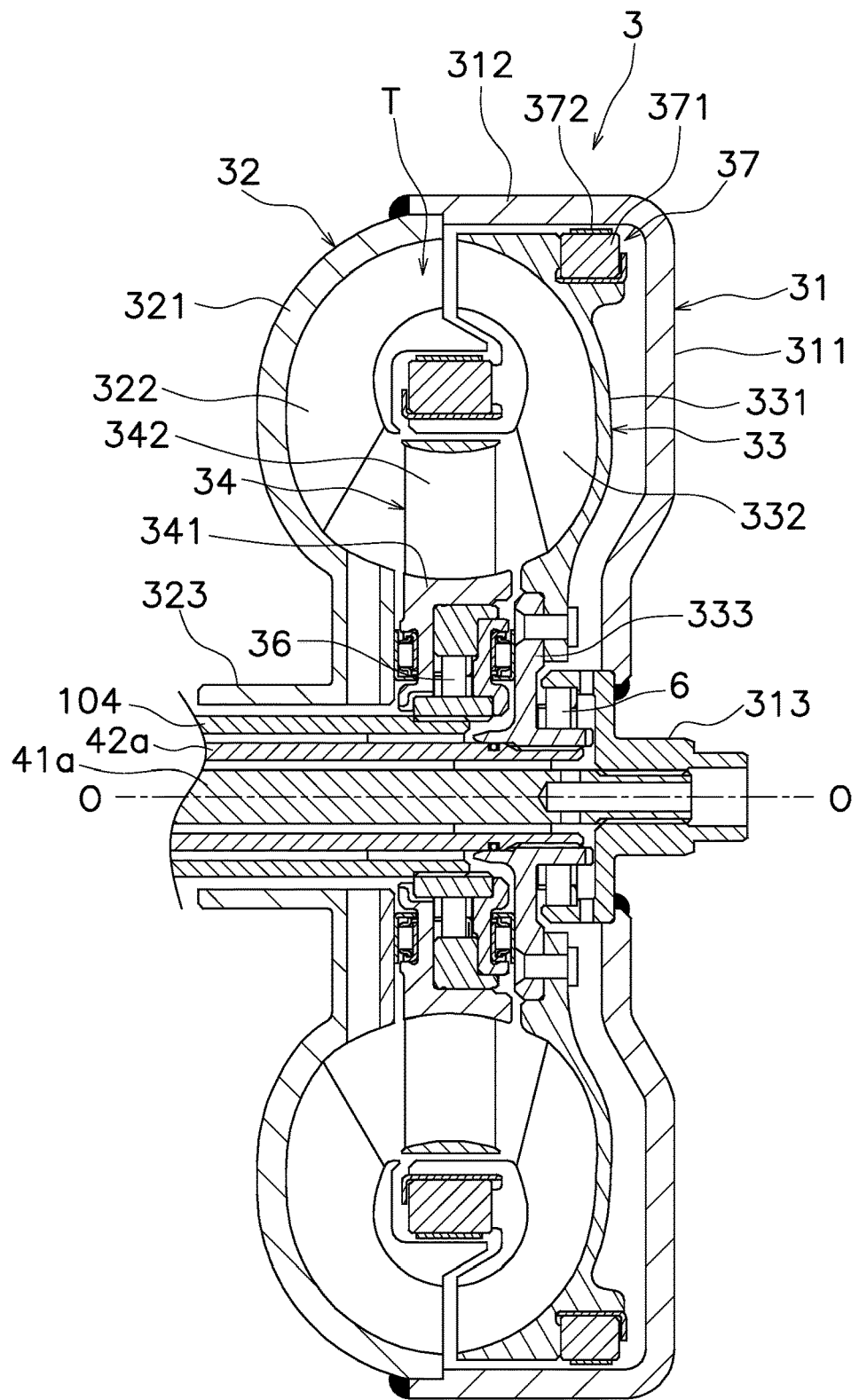
FIG. 5 is a cross-sectional view of a torque converter.

As shown in FIG. 5, the torque converter 3 includes a cover 31, an impeller 32, the turbine 33, a stator 34, and a one-way clutch 36. Besides, the torque converter 3 further includes a lock-up clutch 37 of a centrifugal type. It should be noted that the cover 31 and the impeller 32 correspond to an input part in the present invention, whereas the turbine 33 corresponds to an output part in the present invention.

The torque converter 3 is disposed such that the impeller 32 faces the motor 2 (the left side in FIG. 5), whereas the cover 31 faces opposite to the motor 2 (the right side in FIG. 5). The torque converter 3 is accommodated in the interior of a torque converter casing 30 (see FIG. 2). Hydraulic fluid is supplied to the interior of the torque converter 3. The hydraulic fluid is, for instance, hydraulic oil.

The cover 31 is a component to which the torque, outputted from the motor 2, is inputted. The cover 31 is rotated by the torque inputted thereto from the motor 2. The cover 31 is fixed to the first torque transmission shaft 41a. For example, the cover 31 includes a spline hole to which the first torque transmission shaft 41a is spline-coupled. Because of this, the cover 31 is unitarily rotated with the first torque transmission shaft 41a. The cover 31 is disposed to cover the turbine 33.

The cover 31 includes a disc portion 311, a cylindrical portion 312, and a cover hub 313. The disc portion 311 includes an opening in the middle thereof. The cylindrical portion 312 extends from the outer peripheral end of the disc portion 311 toward the motor 2. The disc portion 311 and the cylindrical portion 312 are provided as a single member integrated with each other.

The cover hub 313 is fixed to the inner peripheral end of the disc portion 311. In the present preferred embodiment, the cover hub 313 is provided as a different member separated from the disc portion 311. However, the cover hub 313 can be provided as a single member integrated with the disc portion 311.

The cover hub 313 includes the spline hole to which the first torque transmission shaft 41a is spline-coupled. The cover hub 313 is rotatably supported by the torque converter casing 30 through a bearing member (not shown in the drawings).

The impeller 32 is unitarily rotated with the cover 31. The impeller 32 is fixed to the cover 31. The impeller 32 includes an impeller shell 321, a plurality of impeller blades 322, and an impeller hub 323.

The impeller shell 321 is fixed to the cover 31. The plural impeller blades 322 are attached to the inner surface of the impeller shell 321.

The impeller hub 323 is attached to the inner peripheral end of the impeller shell 321. It should be noted that in the present preferred embodiment, the impeller hub 323 is provided as a single member integrated with the impeller shell 321, but alternatively, can be provided as a different member separated from the impeller shell 321.

The turbine 33 is disposed in opposition to the impeller 32. When described in detail, the turbine 33 is axially opposed to the impeller 32. The turbine 33 is a component to which the torque is transmitted from the impeller 32 through the hydraulic fluid.

The turbine 33 includes a turbine shell 331, a plurality of turbine blades 332, and a turbine hub 333. The plural turbine blades 332 are fixed to the inner surface of the turbine shell 331.

The turbine hub 333 is fixed to the inner peripheral end of the turbine shell 331. For example, the turbine hub 333 is fixed to the turbine shell 331 by rivets. In the present preferred embodiment, the turbine hub 333 is provided as a different member separated from the turbine shell 331. However, the turbine hub 333 can be provided as a single member integrated with the turbine shell 331.

The second torque transmission shaft 42a is attached to the turbine hub 333. When described in detail, the second torque transmission shaft 42a is spline-coupled to the turbine hub 333. The turbine hub 333 is unitarily rotated with the second torque transmission shaft 42a. In other words, the torque converter 3 outputs the amplified torque to the second torque transmission shaft 42a.

The stator 34 is configured to regulate the flow of the hydraulic oil returning from the turbine 33 to the impeller 32. The stator 34 is rotatable about the rotational axis O. For example, the stator 34 is supported by a stationary shaft 104 through the one-way clutch 36. The stator 34 is disposed axially between the impeller 32 and the turbine 33.

It should be noted that the stationary shaft 104 axially extends through the interior of the impeller hub 323. The stationary shaft 104 has a cylindrical shape and the second torque transmission shaft 42a axially extends through the interior of the stationary shaft 104. Besides, the stationary shaft 104 extends from, for instance, the transmission casing 40 or the torque converter casing 30. The stationary shaft 104 is non-rotatable.

The stator 34 includes a stator carrier 341 having a disc shape and a plurality of stator blades 342 attached to the outer peripheral surface of the stator carrier 341.

The one-way clutch 36 is disposed between the stationary shaft 104 and the stator 34. The one-way clutch 36 is configured to make the stator 34 rotatable in the first rotational direction. By contrast, the one-way clutch 36 makes the stator 34 non-rotatable in the second rotational direction. The torque is transmitted from the impeller 32 to the turbine 33, while being amplified by the stator 34.

The centrifugal lock-up clutch 37 is attached to the turbine 33. The lock-up clutch 37 is unitarily rotated with the turbine 33. The lock-up clutch 37 is configured to couple the cover 31 and the turbine 33 to each other by a centrifugal force generated in rotation of the turbine 33. When described in detail, the lock-up clutch 37 is configured to transmit the torque from the cover 31 to the turbine 33 when the rotational speed of the turbine 33 becomes greater than or equal to a predetermined value.

The lock-up clutch 37 includes a plurality of centrifugal elements 371 and a plurality of friction materials 372. The friction materials 372 are attached to the outer peripheral surfaces of the centrifugal elements 371, respectively. The centrifugal elements 371 are disposed to be radially movable. It should be noted that the centrifugal elements 371 are disposed to be circumferentially immovable. Because of this, the centrifugal elements 371 are rotated together with the turbine 33 and are moved radially outward by centrifugal forces.

When the rotational speed of the turbine 33 becomes greater than or equal to the predetermined value, the lock-up clutch 37 is configured such that the centrifugal elements 371 are moved radially outward and the friction materials 372 are engaged by friction with the inner peripheral surface of the cylindrical portion 312 of the cover 31. As a result, the lock-up clutch 37 is turned to an on state, and the torque inputted to the cover 31 is transmitted therefrom to the turbine 33 through the lock-up clutch 37. It should be noted that even when the lock-up clutch 37 is turned to the on state, the hydraulic fluid is flowable through the lock-up clutch 37.

When the rotational speed of the turbine 33 becomes less than the predetermined value, the centrifugal elements 371 are moved radially inward, whereby the friction materials 372 and the inner peripheral surface of the cylindrical portion 312 of the cover 31, engaged by friction, are disengaged from each other. As a result, the lock-up clutch 37 is turned to an off state, and the torque inputted to the cover 31 is not transmitted therefrom to the turbine 33 through the lock-up clutch 37. In other words, the torque inputted to the cover 31 is transmitted therefrom to the impeller 32 and is then transmitted to the turbine 33 through the hydraulic fluid.

<First Clutch>

The first clutch 6 is configured to allow and block torque transmission between the input part and the output part in the torque converter 3. When described in detail, the first clutch 6 is configured to allow and block torque transmission between the cover 31 and the turbine 33.

The first clutch 6 is disposed between the cover 31 and the turbine 33. The first clutch 6 is a one-way clutch.

The first clutch 6 blocks transmission of the torque outputted from the motor 2 when the torque is directed in the first rotational direction. In other words, when the torque, outputted from the motor 2 so as to be directed in the first rotational direction, is inputted to the first clutch 6, the first clutch 6 makes the cover 31 rotatable relative to the turbine 33. Because of this, when the motor 2 is rotated in the first rotational direction, the first clutch 6 does not allow torque transmission from the cover 31 to the turbine 33. As a result, the torque, outputted from the motor 2 so as to be directed in the first rotational direction, is sequentially transmitted to the cover 31, the impeller 32, and the turbine 33 in this order.

By contrast, the first clutch 6 transmits the torque outputted from the motor 2 when the torque is directed in the second rotational direction. In other words, when the torque, outputted from the motor 2 so as to be directed in the second rotational direction, is inputted to the first clutch 6, the first clutch 6 makes the cover 31 unitarily rotate with the turbine 33. Because of this, when the motor 2 is rotated in the second rotational direction, the first clutch 6 allows torque transmission from the cover 31 to the turbine 33. The torque, outputted from the motor 2 so as to be directed in the second rotational direction, is transmitted without through the impeller 32 and the hydraulic fluid.

<First and Second Gear Trains>

As shown in FIG. 2, the first and second gear trains 71 and 72 are disposed axially between the motor 2 and the torque converter 3. Besides, the first torque output gear 51, the first torque input gear 52, and the second torque input gear 53 in the first clutch mechanism 5 are disposed axially between the first and second gear trains 71 and 72. The first and second gear trains 71 and 72 are accommodated in the transmission casing 40.

As shown in FIGS. 1 and 2, the first and second gear trains 71 and 72 output the torque toward the output unit 101. When described in detail, the first and second gear trains 71 and 72 output the torque to the drive wheels 110 through the final gear train 102, the differential gear 103, and the drive shafts 105.

The first and second gear trains 71 and 72 are configured to output the torque, outputted from the motor 2 so as to be directed in the first rotational direction, as a forward rotation directional torque. In other words, the first and second gear trains 71 and 72 are configured to output the torque, outputted from the motor 2 so as to be directed in the second rotational direction, as a reverse rotation directional torque. Because of this, when the motor 2 is rotated in the first rotational direction and the torque is outputted therefrom to the drive wheels 110 through the first or second gear train 71, 72, the vehicle is moved forward. By contrast, when the motor 2 is rotated in the second rotational direction and the torque is outputted therefrom to the drive wheels 110 through the first or second gear train 71, 72, the vehicle is moved backward.

The first gear train 71 is disposed in the first torque transmission path 4a. The first gear train 71 is disposed downstream with respect to the torque converter 3. Specifically, the first gear train 71 is attached to the second torque transmission shaft 42a.

As shown in FIG. 3, the first gear train 71 includes a first gear 71a and a second gear 71b that are meshed with each other. The first gear 71a is attached to the downstream-side end of the second torque transmission shaft 42a. The first gear 71a is unitarily rotated with the second torque transmission shaft 42a.

The second gear 71b is supported by a drive shaft 70. The second gear 71b is unitarily rotated with the drive shaft 70. The second gear 71b outputs the torque, inputted thereto from the first gear 71a, to the drive shaft 70.

The second gear train 72 is disposed in the second torque transmission path 4b. The second gear train 72 includes a third gear 72a and a fourth gear 72b that are meshed with each other. The number of gears in the second gear train 72 is equal to that in the first gear train 71.

The third gear 72a is unitarily rotated with the second torque input gear 53. The third gear 72a is integrated with the second torque input gear 53. The third gear 72a can be provided as a single member integrated with the second torque input gear 53, or alternatively, can be provided as a different member separated from the second torque input gear 53. The third gear 72a is supported by the output shaft 24, while being rotatable relative thereto.

The fourth gear 72b is supported by the drive shaft 70. The fourth gear 72b is unitarily rotated with the drive shaft 70. The fourth gear 72b outputs the torque, inputted thereto from the third gear 72a, to the drive shaft 70.

The first gear train 71 is different in reduction ratio from the second gear train 72. When described in detail, the first gear train 71 is higher in reduction ratio than the second gear train 72.

<Controller>

As shown in FIG. 1, the controller 9 is configured to control the motor 2 and the first switch mechanism 5. For example, a computer (e.g., microcomputer), including a CPU (Central Processing Unit), a ROM (Read Only Memory), and so forth, is provided as the controller 9. The ROM stores programs for various computations. The CPU executes the programs stored in the ROM.

The controller 9 executes any of a first forward moving mode, a second forward moving mode, a first reverse moving mode, and a second reverse moving mode. When the controller 9 executes the first or second forward moving mode, the drive unit 100 is actuated to move the vehicle forward. By contrast, when the controller 9 executes the first or second reverse moving mode, the drive unit 100 is actuated to move the vehicle backward.

When executing the first forward moving mode, the controller 9 controls and causes the motor 2 to be rotated in the first rotational direction. Besides, when executing the first forward moving mode, the controller 9 controls the first switch mechanism 5 such that transmission of the torque outputted from the motor 2 is made through the first torque transmission path 4a.

When described in detail, the controller 9 controls the actuator 55 such that the first ring gear 54 is set to the first coupling state. As a result, the first ring gear 54 couples the first torque output gear 51 and the first torque input gear 52 to each other, whereby the torque, outputted from the motor 2, is transmitted to the first torque transmission path 4a.

It should be noted that when the controller 9 controls and causes the motor 2 to be rotated in the first rotational direction, the first clutch 6 blocks torque transmission. As a result, the torque, outputted from the motor 2 so as to be directed in the first rotational direction, is transmitted via the torque converter 3. It should be noted that when the rotational speed of the turbine 33 in the torque converter 3 becomes greater than or equal to a predetermined value, the lock-up clutch 37 is turned to a lock-up on state, whereby torque transmission is made. In other words, torque transmission is directly made from the cover 31 to the turbine 33 without through the hydraulic fluid.

When executing the second forward moving mode, the controller 9 controls and causes the motor 2 to be rotated in the first rotational direction. Besides, when executing the second forward moving mode, the controller 9 controls the first switch mechanism 5 such that transmission of the torque outputted from the motor 2 is made through the second torque transmission path 4b.

When described in detail, the controller 9 controls the actuator 55 such that the first ring gear 54 is set to the second coupling state. As a result, the first ring gear 54 couples the first torque output gear 51 and the second torque input gear 53 to each other, whereby the torque, outputted from the motor 2, is transmitted to the second torque transmission path 4b.

In the first forward moving mode, torque amplification is enabled by the torque converter 3. Besides, in the first forward moving mode, torque transmission is made through the first gear train 71 higher in reduction ratio than the second gear train 72. Therefore, in the first forward moving mode, the drive unit 100 is enabled to output a high drive force during traveling at low speed. In other words, the first forward moving mode is suitable for traveling at low speed.

By contrast, in the second forward moving mode, torque transmission is directly made without through the torque converter 3; hence, torque transmission can be made efficiently. Besides, in the second forward moving mode, torque transmission is made through the second gear train 72 lower in reduction ratio than the first gear train 71; hence, the motor 2 can be reduced in rotational speed. The second forward moving mode is suitable for traveling at high speed.

When executing the first reverse moving mode, the controller 9 controls and causes the motor 2 to be rotated in the second rotational direction. Besides, when executing the first reverse moving mode, the controller 9 controls the first switch mechanism 5 such that transmission of the torque outputted from the motor 2 is made through the second torque transmission path 4b. It should be noted that the method of controlling the first switch mechanism 5 is identical to that in the second forward moving mode described above.

When executing the second reverse moving mode, the controller 9 controls and causes the motor 2 to be rotated in the second rotational direction. Besides, when executing the second reverse moving mode, the controller 9 controls the first switch mechanism 5 such that transmission of the torque outputted from the motor 2 is made through the first torque transmission path 4a. It should be noted that the method of controlling the first switch mechanism 5 is identical to that in the first forward moving mode described above.

Torque transmission is made through the first clutch 6 in the first torque transmission path 4a. In other words, transmission of the torque directed in the second rotational direction is made without through the torque converter 3 in the first torque transmission path 4a.

<Actions>

In the drive unit 100 configured as described above, the controller 9 executes either the first forward moving mode or the second forward moving mode when the vehicle is moved forward. It should be noted that either the first forward moving mode or the second forward moving mode can be selected in accordance with operation by a driver or can be selected by the controller 9 based on at least one traveling condition or so forth.

The controller executes either the first reverse moving mode or the second reverse moving mode when the vehicle is moved backward. In similar manner to the above, either the first reverse moving mode or the second reverse moving mode can be selected in accordance with operation by the driver or can be selected by the controller 9 based on at least one traveling condition or so forth.

[Modifications]

One preferred embodiment of the present invention has been explained above. However, the present invention is not limited to the above, and a variety of changes can be made without departing from the gist of the present invention. It should be noted that modifications to be described, excluding part thereof, are applicable simultaneously.

Figure 6:
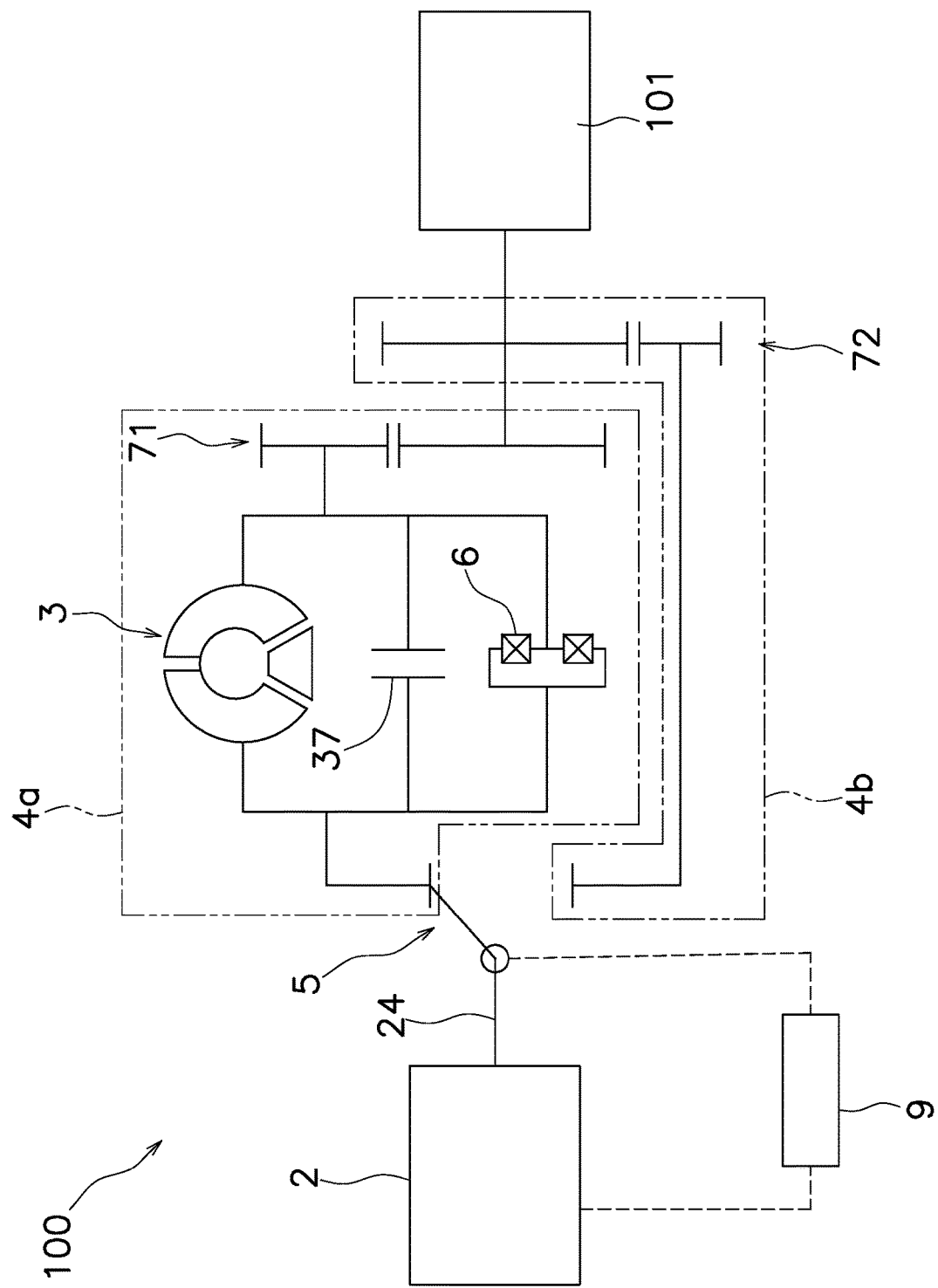
FIG. 6 is a block diagram showing torque transmission paths in a drive unit according to a modification.

(a) In the preferred embodiment described above, the first gear train 71 is higher in reduction ratio than the second gear train 72. However, the configuration for the first and second gear trains 71 and 72 is not limited to the above. For example, as shown in FIG. 6, the second gear train 72 can be higher in reduction ratio than the first gear train 71.

Figure 7:
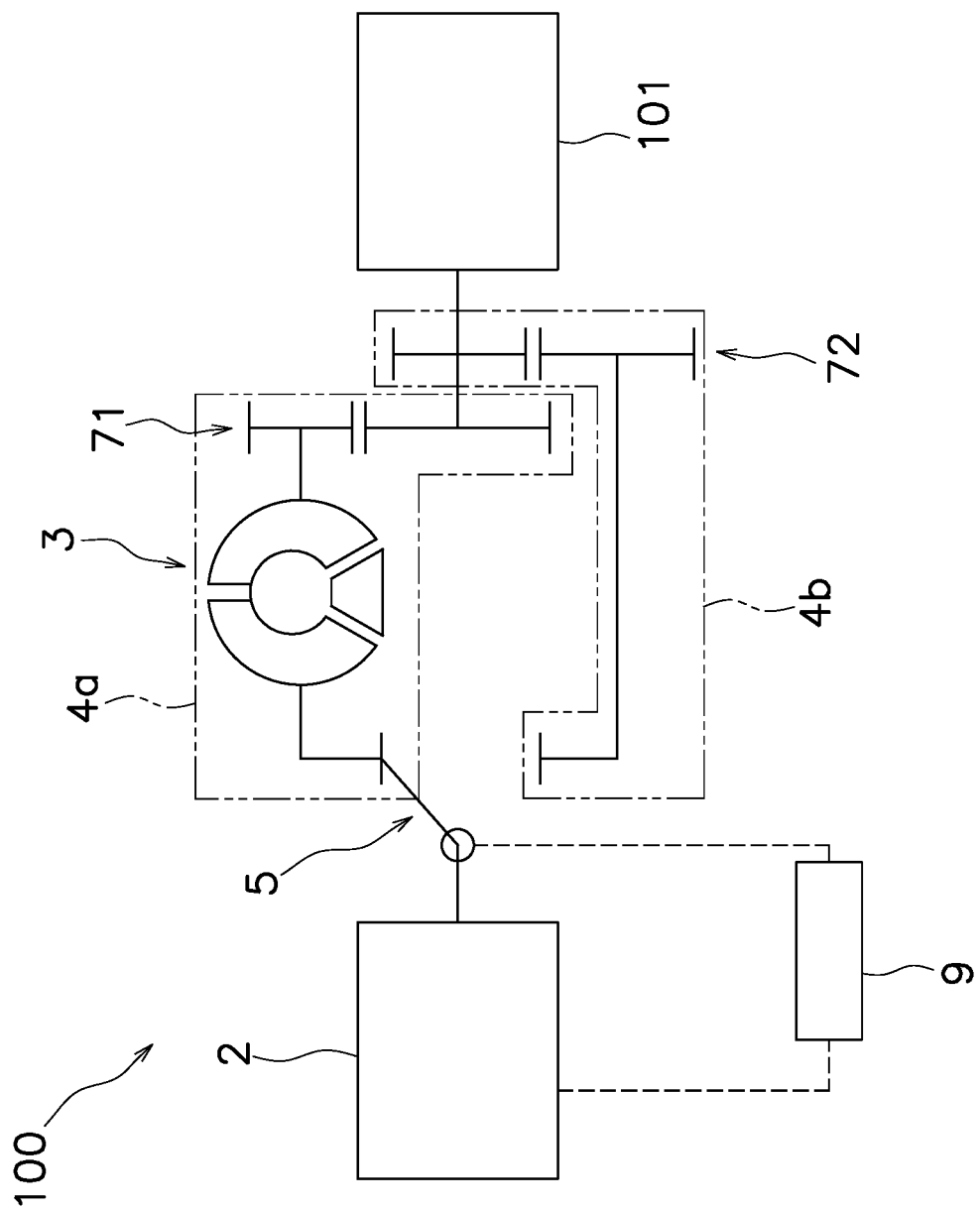
FIG. 7 is a block diagram showing torque transmission paths in a drive unit according to another modification.

(b) As shown in FIG. 7, the drive unit 100 may not include the first clutch 6. Besides, the torque converter 3 may not include the lock-up clutch 37.

Figure 8:
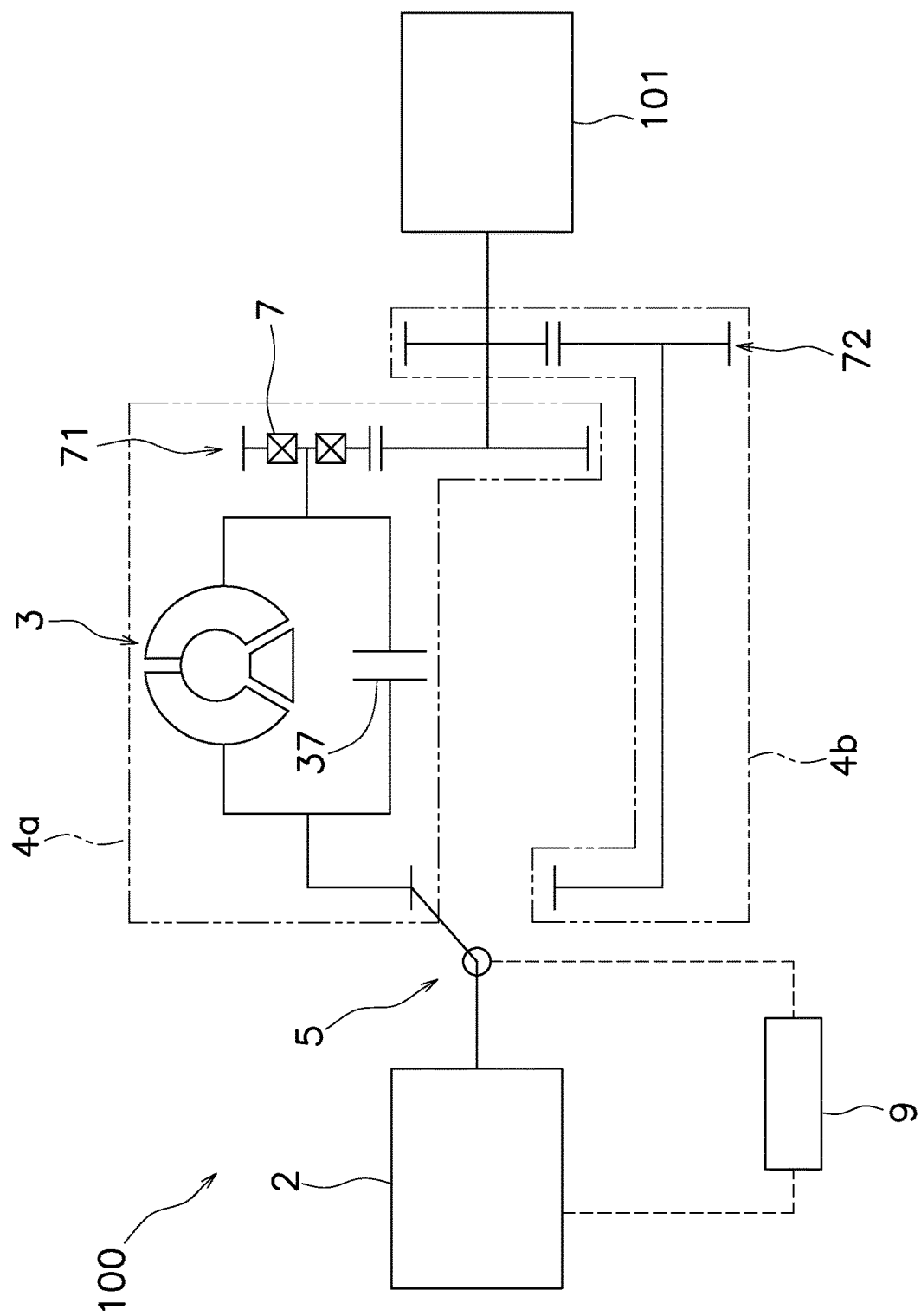
FIG. 8 is a block diagram showing torque transmission paths in a drive unit according to still another modification.

(c) As shown in FIG. 8, the drive unit 100 can include a second clutch 7. The second clutch 7 is disposed in the first torque transmission path 4a. The second clutch 7 is disposed downstream with respect to the torque converter 3. The second clutch 7 is configured to allow and block torque transmission.

When described in detail, the second clutch 7 is a one-way clutch. The second clutch 7 is configured to allow transmitting downstream the torque outputted from the torque converter 3 and block transmitting the torque from downstream to the torque converter 3.

Figure 9:
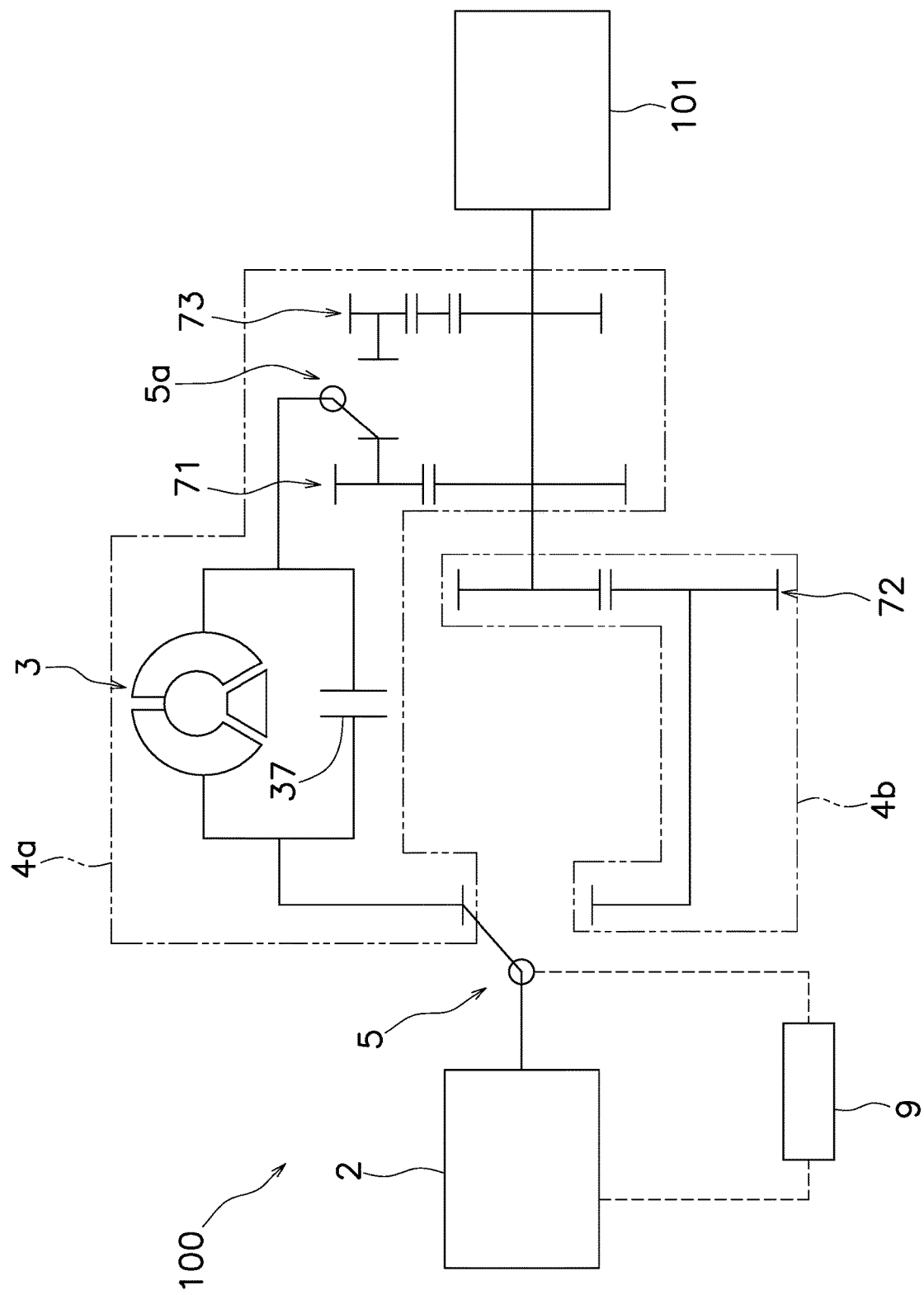
FIG. 9 is a block diagram showing torque transmission paths in a drive unit according to yet another modification.

(d) As shown in FIG. 9, the drive unit 100 can include a third gear train 73 and a second switch mechanism 5a. The third gear train 73 is disposed in the first torque transmission path 4a. In other words, two gear trains, composed of the first and third gear trains 71 and 73, are installed in the first torque transmission path 4a. Besides, the first and third gear trains 71 and 73 are disposed parallel to each other.

The third gear train 73 is configured to receive the torque transmitted thereto from the torque converter 3. The third gear train 73 is attached to the second torque transmission shaft 42a. The third gear train 73 is configured to output the torque toward the output unit 101. When described in detail, the third gear train 73 outputs the torque to the drive wheels 110 through the final gear train 102, the differential gear 103, and the drive shafts 105.

The third gear train 73 outputs the torque in a reverse rotational direction to when the torque is outputted from the first gear train 71. When described in detail, the third gear train 73 is configured to output the torque, outputted from the motor 2 so as to be directed in the first rotational direction, as a reverse rotation directional torque. In other words, the third gear train 73 is configured to output the torque, outputted from the motor 2 so as to be directed in the second rotational direction, as a forward rotation directional torque. Because of this, when the motor 2 is rotated in the first rotational direction and the torque is outputted therefrom to the output unit 101 through the third gear train 73, the vehicle is moved backward. By contrast, when the motor 2 is rotated in the second rotational direction and the torque is outputted therefrom to the output unit 101 through the third gear train 73, the vehicle is moved forward.

The controller 9 is enabled to execute a third reverse moving mode in addition to the first and second reverse moving modes. When executing the third reverse moving mode, the controller 9 controls and causes the motor 2 to be rotated in the first rotational direction. Besides, when executing the third reverse moving mode, the controller 9 controls the first switch mechanism 5 such that transmission of the torque outputted from the motor 2 is made through the first torque transmission path 4a. Moreover, when executing the third reverse moving mode, the controller 9 controls the second switch mechanism 5a such that transmission of the torque amplified by the torque converter 3 is made through the third gear train 73.

Figure 10:
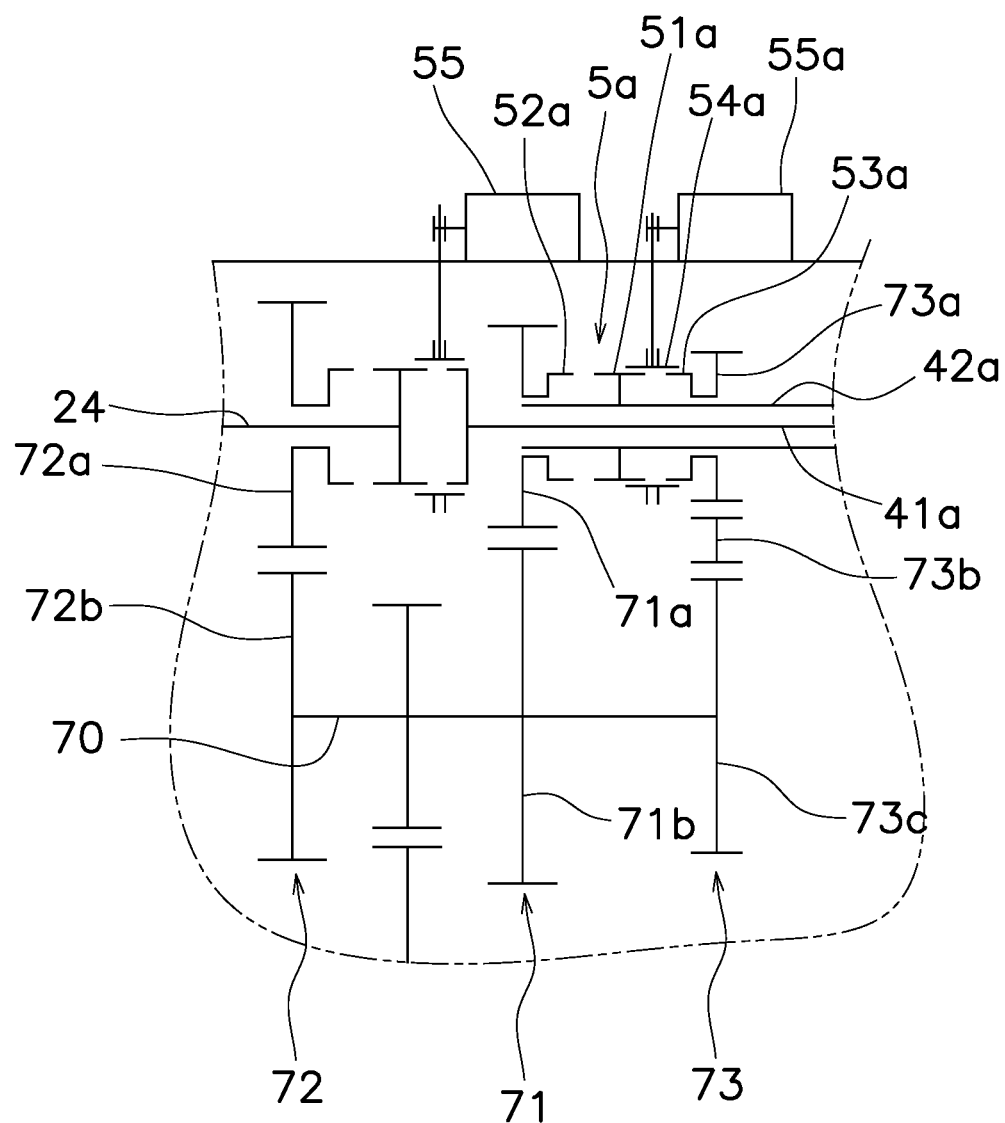
FIG. 10 is a closeup view of a second switch mechanism and the periphery thereof.

As shown in FIG. 10, the third gear train 73 includes fifth to seventh gears 73a to 73c. The fifth gear 73a is supported by the second torque transmission shaft 42a, while being rotatable relative thereto. By meshing of a second ring gear 54a (to be described) in the second switch mechanism 5a, the fifth gear 73a is unitarily rotated with the second torque transmission shaft 42a.

The sixth gear 73b is meshed with the fifth gear 73a. The sixth gear 73b is supported by a countershaft (not shown in the drawings). The sixth gear 73b can be rotated unitarily with or relative to the countershaft.

The seventh gear 73c is meshed with the sixth gear 73b. The seventh gear 73c is supported by the drive shaft 70. The seventh gear 73c is unitarily rotated with the drive shaft 70. The seventh gear 73c outputs the torque, transmitted thereto from the fifth gear 73a, to the drive shaft 70.

Besides, in the present modification, in similar manner to the fifth gear 73a, the first gear 71a is supported by the second torque transmission shaft 42a, while being rotatable relative thereto.

The second switch mechanism 5a is configured to switch between the first gear train 71 and the third gear train 73 as the path for transmitting the torque after the torque is outputted from the torque converter 3. Besides, the second switch mechanism 5a is settable to a neutral position without selecting any of the first and third gear trains 71 and 73 so as to block transmission of the torque outputted from the torque converter 3. For example, when executing the second forward moving mode described above, the controller 9 controls and causes the second switch mechanism 5a to be set to the neutral position.

The second switch mechanism 5a includes a second torque output gear 51a, a third torque input gear 52a, a fourth torque input gear 53a, the second ring gear 54a, and a second actuator 55a. The second actuator 55a is controlled by the controller 9. When controlled by the controller 9, the second actuator 55*a* is caused to axially move the second ring gear 54*a*.

The second torque output gear 51*a* is attached to the second torque transmission shaft 42*a*. The second torque output gear 51*a* is unitarily rotated with the second torque transmission shaft 42*a*. The second torque output gear 51*a* can be provided as a single member integrated with the second torque transmission shaft 42*a*, or alternatively, can be provided as a different member separated from the second torque transmission shaft 42*a*. The second torque output gear 51*a* includes a plurality of teeth on the outer peripheral surface thereof.

The third torque input gear 52*a* is supported by the second torque transmission shaft 42*a*, while being rotatable relative thereto. When meshed with the second ring gear 54*a*, the third torque input gear 52*a* is unitarily rotated with the second torque transmission shaft 42*a*. The third torque input gear 52*a* is unitarily rotated with the first gear 71*a* in the first gear train 71. It should be noted that the third torque input gear 52*a* can be provided as a single member integrated with the first gear 71*a*, or alternatively, can be provided as a different member separated from the first gear 71*a*.

The fourth torque input gear 53*a* is supported by the second torque transmission shaft 42*a*, while being rotatable relative thereto. When meshed with the second ring gear 54*a*, the fourth torque input gear 53*a* is unitarily rotated with the second torque transmission shaft 42*a*. The fourth torque input gear 53*a* is unitarily rotated with the fifth gear 73*a* in the third gear train 73. It should be noted that the fourth torque input gear 53*a* can be provided as a single member integrated with the fifth gear 73*a*, or alternatively, can be provided as a different member separated from the fifth gear 73*a*.

The second ring gear 54*a* includes a plurality of teeth on the inner peripheral surface thereof. The second ring gear 54*a* is constantly meshed with the second torque output gear 51*a* and is unitarily rotated therewith. In other words, the second ring gear 54*a* is unitarily rotated with the second torque transmission shaft 42*a*. The second ring gear 54*a* is disposed to be movable in the axial direction.

The second ring gear 54*a* is meshed with the second torque output gear 51*a* and is also capable of being turned to a state of engagement with the third torque input gear 52*a*. When the second ring gear 54*a* is meshed with the second torque output gear 51*a* and the third torque input gear 52*a* as described above, the torque, transmitted from the second torque transmission shaft 42*a*, is outputted through the first gear train 71.

On the other hand, the second ring gear 54*a* is meshed with the second torque output gear 51*a* and is also capable of being turned to a state of engagement with the fourth torque input gear 53*a*. When the second ring gear 54*a* is meshed with the second torque output gear 51*a* and the fourth torque input gear 53*a* as described above, the torque, transmitted from the second torque transmission shaft 42*a*, is outputted through the third gear train 73.

By contrast, when the second switch mechanism 5*a* is set to the neutral position, the second ring gear 54*a* is turned to a state of meshing with only the second torque output gear 51*a*. When the second ring gear 54*a* is meshed with only the second torque output gear 51*a* without being meshed with either the third torque input gear 52*a* or the fourth torque input gear 53*a*, torque transmission can be blocked between the drive shaft 70 and the second torque transmission shaft 42*a*. With this configuration, the torque converter 3 and so forth can be prevented from being rotated in conjunction with another component, while the drive unit 100 is driven in the second forward moving mode.

The second switch mechanism 5*a* is controlled by the controller 9. When controlled by the controller 9, the second ring gear 54*a* is moved in the axial direction. The axial movement of the second ring gear 54*a* results in meshing with the second torque output gear 51*a* and the third torque input gear 52*a*, meshing with the second torque output gear Ma and the fourth torque input gear 53*a*, or meshing with only the second torque output gear 51*a*.

Figure 11:
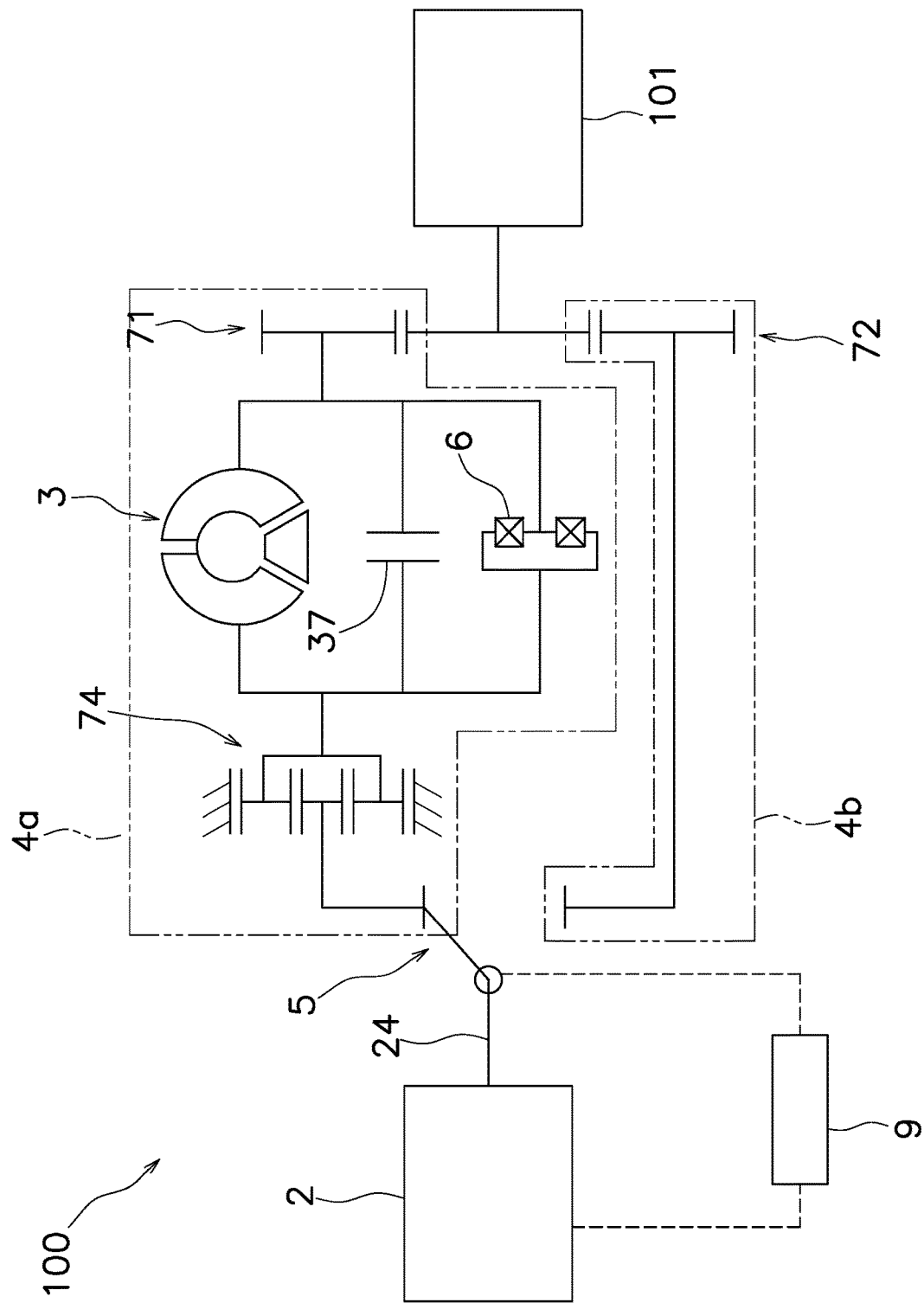
FIG. 11 is a block diagram showing torque transmission paths in a drive unit according to further still another modification.

(e) As shown in FIG. 11, the drive unit 100 can further include a fourth gear train 74. The fourth gear train 74 is disposed in the first torque transmission path 4*a*. The fourth gear train 74 is disposed upstream with respect to the torque converter 3. The fourth gear train 74 changes the speed of a torque inputted thereto and outputs the torque changed in speed. The fourth gear train 74 is, for instance, a planetary gear mechanism.

When the drive unit 100 includes the fourth gear train 74 as described above, the first gear train 71 can be set to be equal in reduction ratio to the second gear train 72. For example, the first and third gears 71*a* and 72*a* can be set to be equal in diameter and can be meshed with a single gear attached to the drive shaft 70.

Figure 12:
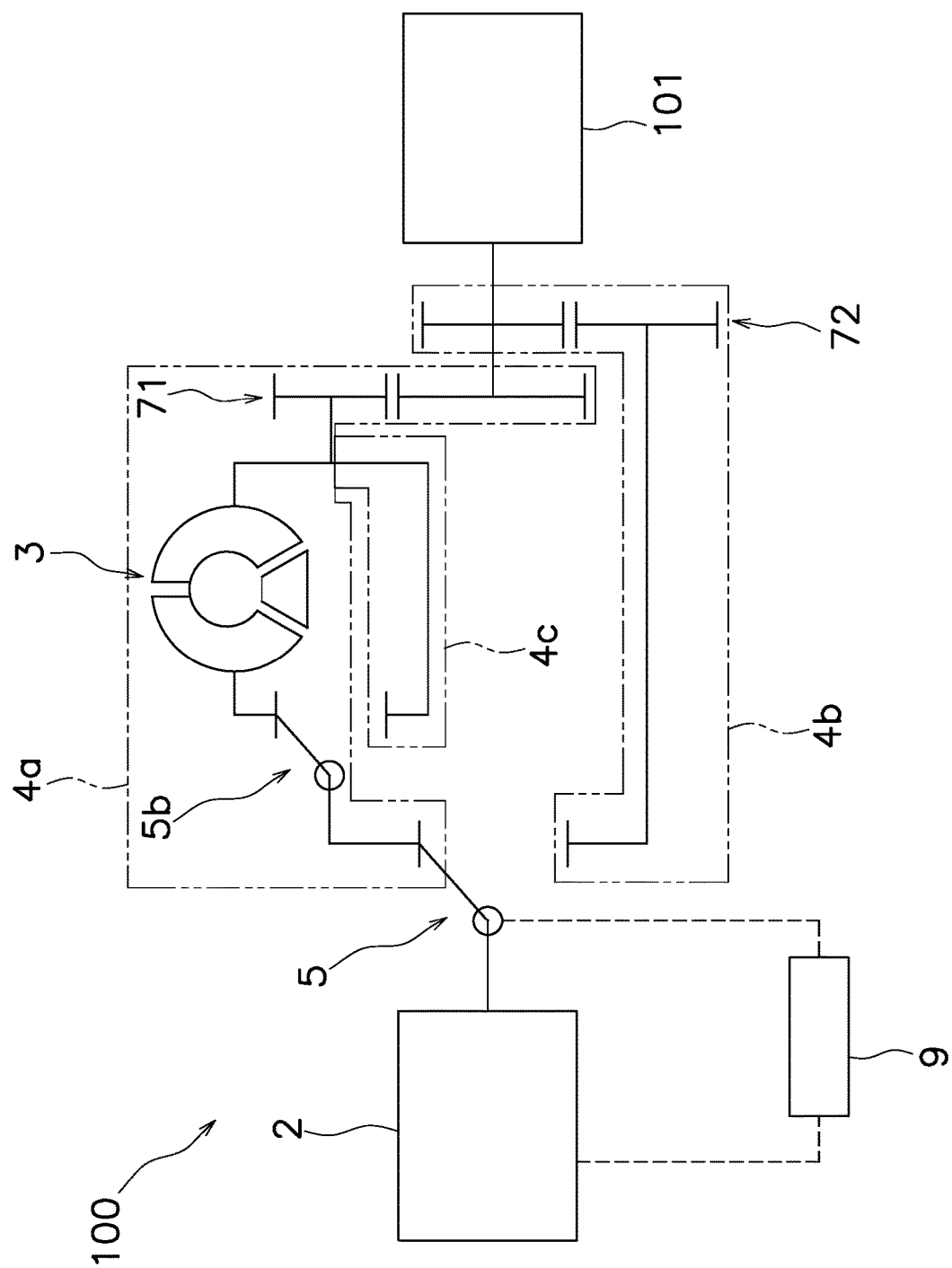
FIG. 12 is a block diagram showing torque transmission paths in a drive unit according to further yet another modification.

(f) As shown in FIG. 12, the drive unit 100 can further include a third torque transmission path 4*c* and a third switch mechanism 5*b*. The third torque transmission path 4*c* branches off from the first torque transmission path 4*a* at a position upstream of the torque converter 3 and merges to the first torque transmission path 4*a* at a position downstream of the torque converter 3.

The third switch mechanism 5*b* is configured to switch between the first torque transmission path 4*a* and the third torque transmission path 4*c* as the path for transmitting the torque. It should be noted that the third switch mechanism 5*b* can be configured in similar manner to the first switch mechanism 5 or the second switch mechanism 5*a*.

(g) In the preferred embodiment described above, the second torque input gear 53, the first torque output gear 51, and the first torque input gear 52 are disposed along the rotational axis O, while being aligned in this order from the side closer to the motor 2. However, the configuration of the first switch mechanism 5 is not limited to this.

Figure 13:
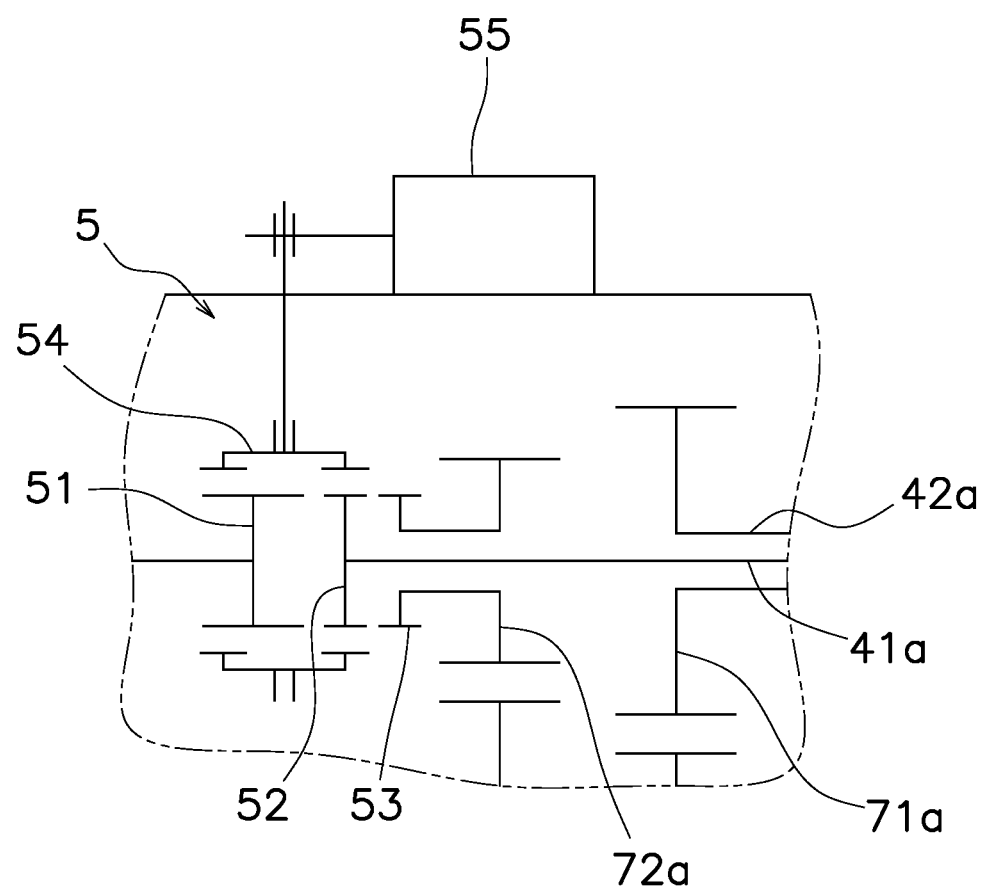
FIG. 13 is a closeup view of a first switch mechanism and the periphery thereof according to still yet another modification.

For example, as shown in FIG. 13, the first torque output gear 51, the first torque input gear 52, and the second torque input gear 53 can be disposed along the rotational axis O, while being aligned in this order from the side closer to the motor 2.

Figure 14:
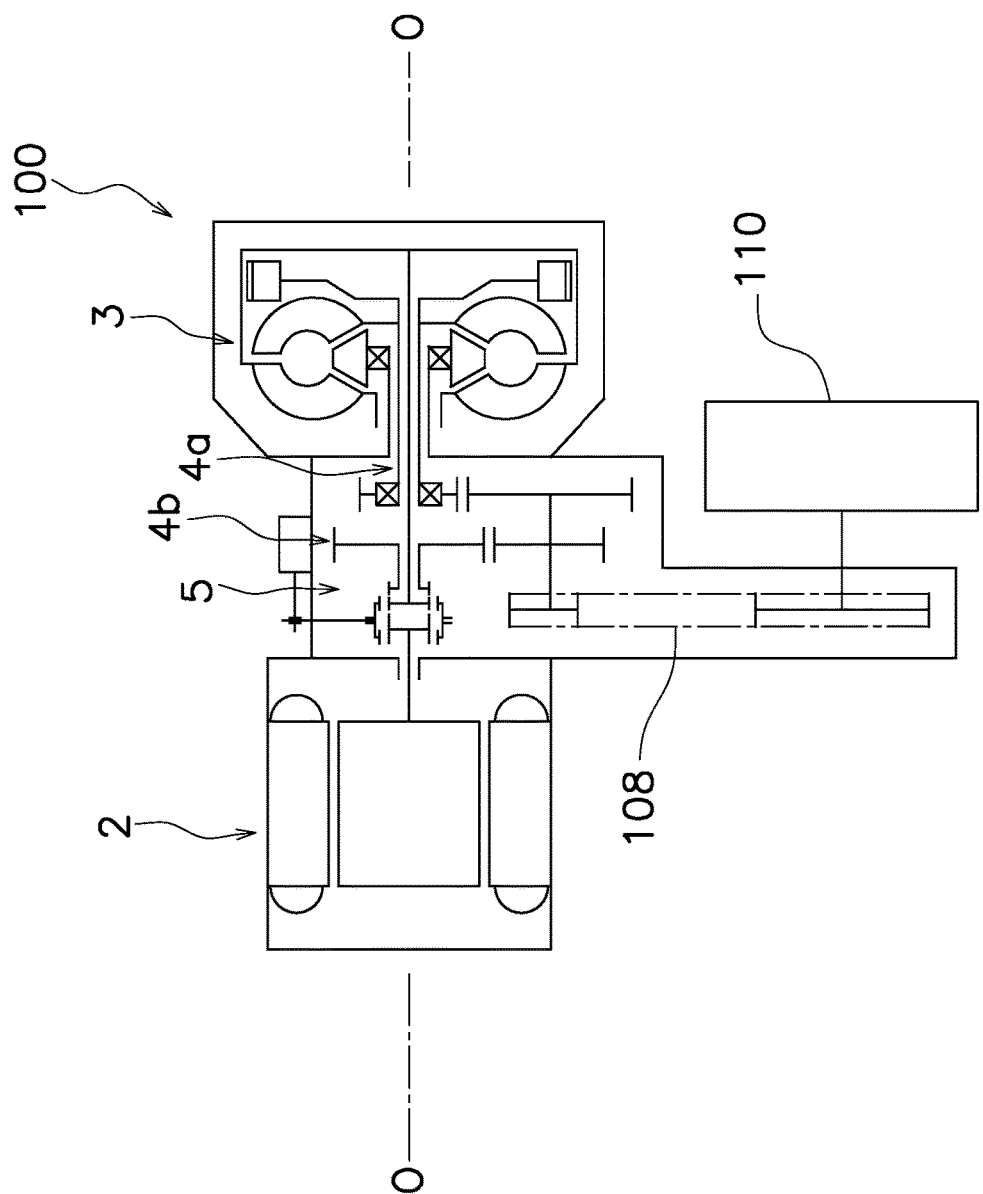
FIG. 14 is a schematic diagram of a drive unit according to the still yet another modification.

The drive unit 100, employing the first switch mechanism 5 configured as described above, is applicable to, for instance, a motorcycle as shown in FIG. 14. In the motorcycle, an output unit does not include any differential gear, but instead, includes a belt 108.

Figure 15:
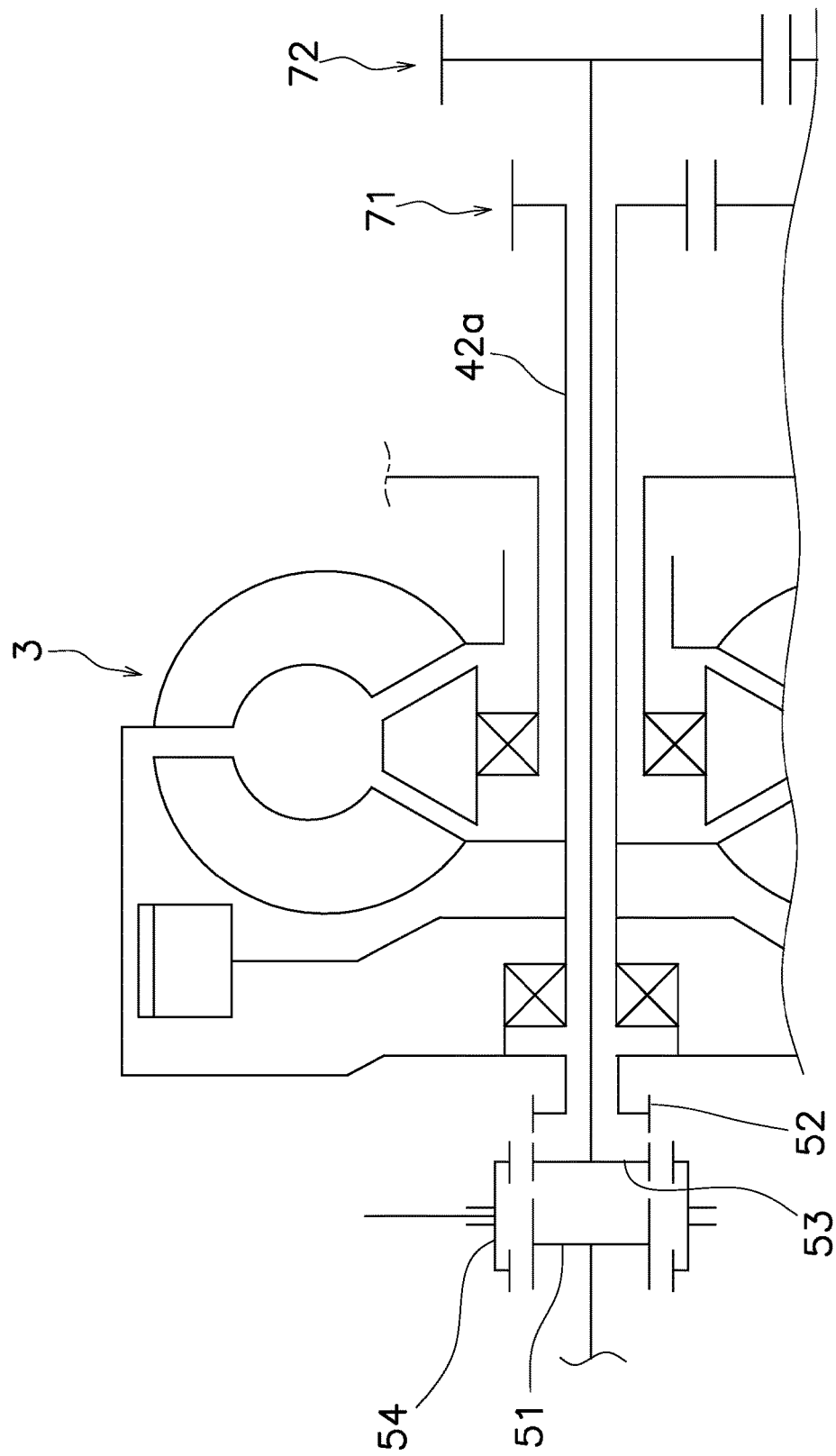
FIG. 15 is a closeup view of a first switch mechanism and the periphery thereof according to further still yet another modification.

(h) As shown in FIG. 15, the first torque output gear 51, the second torque input gear 53, and the first torque input gear 52 can be disposed along the rotational axis O, while being aligned in this order from the side closer to the motor 2.

Figure 16:
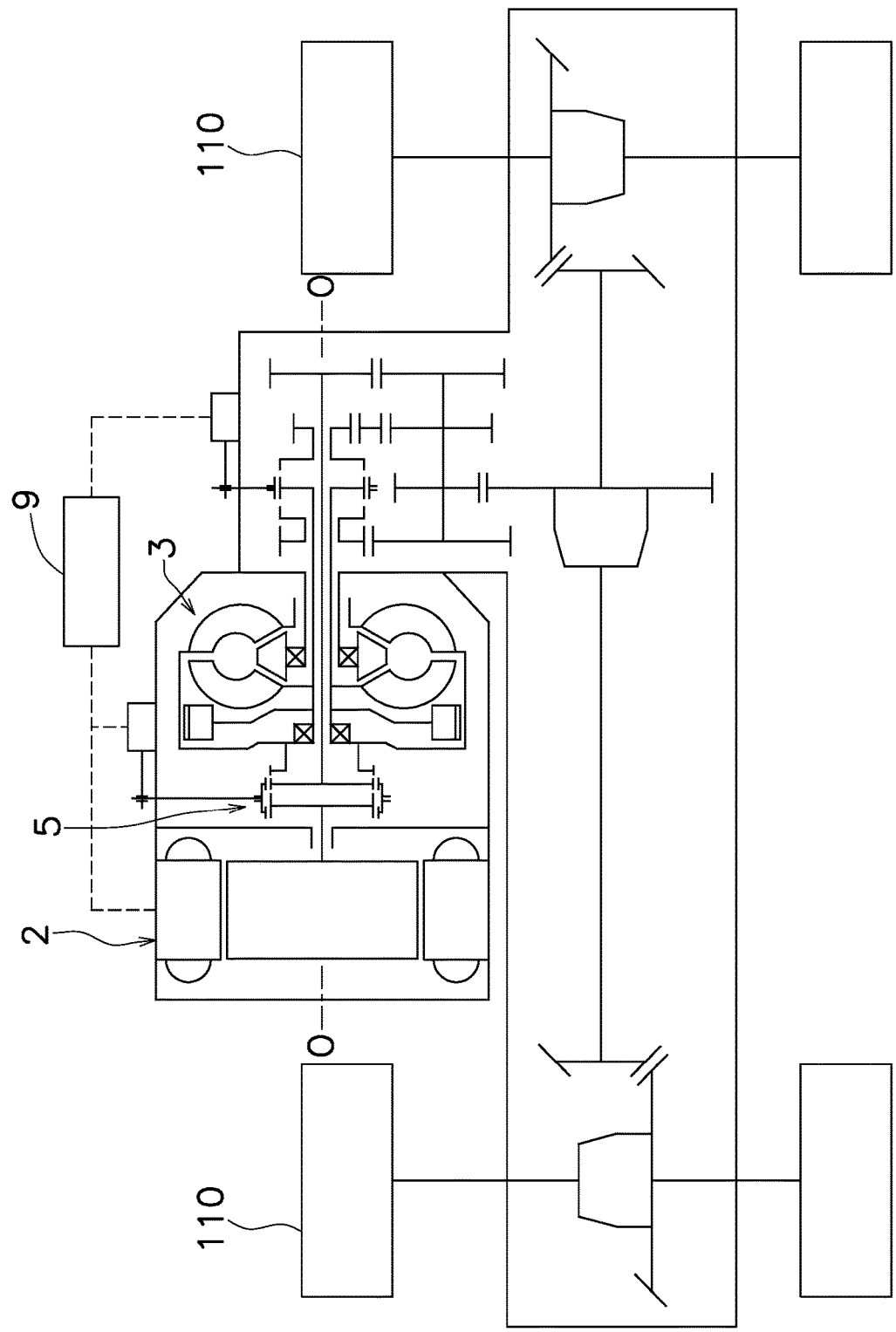
FIG. 16 is a schematic diagram of a drive unit according to the further still yet another modification.

The drive unit 100, employing the first switch mechanism 5 configured as described above, is applicable to, for instance, a four-wheel drive car as shown in FIG. 16.

(i) In the preferred embodiment described above, the first and second gear trains 71 and 72 are disposed between the motor 2 and the torque converter 3. However, the configuration of the drive unit 100 is not limited to this. For example, as shown in FIG. 15, the first and second gear trains 71 and 72 can be disposed on the opposite side of the motor 2 with reference to the torque converter 3. In other words, the torque converter 3 can be disposed between the motor 2 and both the first and second gear trains 71 and 72.

REFERENCE SIGNS LIST

2: Electric motor
3: Torque converter
4a: First torque transmission path
4b: Second torque transmission path
4c: Third torque transmission path
5: First switch mechanism
5a: Second switch mechanism
5b: Third switch mechanism
6: First clutch
7: Second clutch
9: Controller
37: Lock-up Clutch
51: First torque output gear
52: First torque input gear
53: Second torque input gear
54: First ring gear
71: First gear train
72: Second gear train
73: Third gear train
74: Fourth gear train
100: Drive unit
101: Output unit

What is claimed is:

1. A drive unit, comprising:
   an electric motor;
   a first torque transmission path configured to transmit a torque outputted from the electric motor to an output unit, the first torque transmission path having a torque converter disposed therein that is configured to amplify the torque outputted from the electric motor when the torque is directed in a first rotational direction;
   a second torque transmission path provided parallel to the first torque transmission path and having no torque converter disposed therein, the second torque transmission path configured to transmit the torque outputted from the electric motor to the output unit;
   a first gear train disposed in the first torque transmission path, the first gear train disposed downstream with respect to the torque converter;
   a second gear train disposed in the second torque transmission path;
   a first switch mechanism configured to switch between one of the first torque transmission path and the second torque transmission path as a path for transmitting the torque outputted from the electric motor; and
   a controller configured to control the electric motor and to command the operational setting of the first switch mechanism,
   wherein the controller is further configured to execute a first forward moving mode, the controller further configured to control and cause the electric motor to be rotated in the first rotational direction when executing the first forward moving mode, the controller further configured to control the first switch mechanism such that transmission of the torque outputted from the electric motor is made through the first torque transmission path when executing the first forward moving mode; and
   the controller is further configured to execute a second forward moving mode, the controller further configured to control and cause the electric motor to be rotated in the first rotational direction when executing the second forward moving mode, the controller further configured to control the first switch mechanism such that transmission of the torque outputted from the electric motor is made through the second torque transmission path when executing the second forward moving mode.

2. The drive unit according to claim 1, wherein the second gear train is higher in reduction ratio than the first gear train.

3. The drive unit according to claim 1, wherein the first gear train is higher in reduction ratio than the second gear train.

4. The drive unit according to claim 1, further comprising:
   a third gear train disposed in the first torque transmission path, the third gear train configured to receive the torque transmitted thereto from the torque converter; and
   a second switch mechanism configured to switch between the first gear train and the third gear train as the path for transmitting the torque after the torque is outputted from the torque converter, wherein
   the controller is further configured to control the second switch mechanism,
   the second switch mechanism is settable to a neutral position in which neither the first gear train nor the third gear train is engaged so as to block transmission of the torque outputted from the torque converter via either the first gear train or the third gear train, and
   the controller is further configured to control and cause the second switch mechanism to be set to the neutral position when executing the second forward moving mode.

5. The drive unit according to claim 1, further comprising:
   a clutch, wherein
   the torque converter includes an input part and an output part, the input part configured to receive the torque inputted thereto after the torque is outputted from the electric motor, the output part configured to receive the torque transmitted thereto from the input part through a fluid, and
   the clutch is configured and disposed to allow and block transmission of the torque between the input part and the output part.

6. The drive unit according to claim 1, further comprising:
   a clutch disposed downstream with respect to the torque converter in the first torque transmission path, the clutch configured and disposed to allow and block transmission of the torque along the first torque transmission path.

7. The drive unit according to claim 6, wherein the clutch is a one-way clutch configured to allow transmission of the torque outputted from the torque converter to a downstream side and to block transmission of torque from the downstream side to the torque converter.

8. The drive unit according to claim 1, further comprising:
   an upstream gear train disposed upstream with respect to the torque converter in the first torque transmission path.

9. The drive unit according to claim 1, further comprising:
   a third, bypass torque transmission path branching off from the first torque transmission path at a position upstream of the torque converter and merging to the first torque transmission path at a position downstream of the torque converter so as to form a torque-conversion bypass within the first torque transmission path; and
   a bypass-controlling switch mechanism configured to switch between the first torque transmission path and the third, bypass torque transmission path as the path for transmitting the torque.

10. The drive unit according to claim 1, wherein the first switch mechanism includes
a first torque output part configured to output the torque outputted from the electric motor,
a first torque input part disposed in the first torque transmission path, the first torque input part configured to receive the torque inputted thereto after the torque is outputted from the first torque output part,
a second torque input part disposed in the second torque transmission path, the second torque input part configured to receive the torque inputted thereto after the torque is outputted from the first torque output part, and
a coupling part settable to a first coupling state and a second coupling state, the coupling part coupling the first torque output part and the first torque input part therethrough when set to the first coupling state, the coupling part coupling the first torque output part and the second torque input part therethrough when set to the second coupling state.

11. The drive unit according to claim 10, wherein the first torque output part, the first torque input part, and the second torque input part are disposed along a rotational axis of the electric motor so as to be aligned from a side closer to the electric motor in an order of the first torque output part, the first torque input part, and the second torque input part.

12. The drive unit according to claim 10, wherein the first torque output part, the first torque input part, and the second torque input part are disposed along a rotational axis of the electric motor so as to be aligned from a side closer to the electric motor in an order of the second torque input part, the first torque output part, and the first torque input part.

13. The drive unit according to claim 10, wherein the first torque output part, the first torque input part, and the second torque input part are disposed along a rotational axis of the electric motor so as to be aligned from a side closer to the electric motor in an order of the first torque output part, the second torque input part, and the first torque input part.

14. A drive unit, comprising:
an electric motor;
a first torque transmission path configured to transmit a torque outputted from the electric motor to an output unit, the first torque transmission path having a torque converter disposed therein that is configured to amplify the torque outputted from the electric motor when the torque is directed in a first rotational direction;
a second torque transmission path provided parallel to the first torque transmission path and having no torque converter disposed therein, the second torque transmission path configured to transmit the torque outputted from the electric motor to the output unit;
a first gear train disposed in the first torque transmission path, the first gear train disposed downstream with respect to the torque converter;
a second gear train disposed in the second torque transmission path;
a first switch mechanism configured to switch between one of the first torque transmission path and the second torque transmission path as a path for transmitting the torque outputted from the electric motor; and
a controller configured to control the electric motor and to command the operational setting of the first switch mechanism,
wherein the controller is further configured to execute a first reverse moving mode, the controller further configured to control and cause the electric motor to be rotated in a second rotational direction when executing the first reverse moving mode, the controller further configured to control the first switch mechanism such that transmission of the torque outputted from the electric motor is made through the second torque transmission path when executing the first reverse moving mode.

15. A drive unit, comprising:
an electric motor;
a first torque transmission path configured to transmit a torque outputted from the electric motor to an output unit, the first torque transmission path having a torque converter disposed therein that is configured to amplify the torque outputted from the electric motor when the torque is directed in a first rotational direction;
a second torque transmission path provided parallel to the first torque transmission path and having no torque converter disposed therein, the second torque transmission path configured to transmit the torque outputted from the electric motor to the output unit;
a first gear train disposed in the first torque transmission path, the first gear train disposed downstream with respect to the torque converter;
a second gear train disposed in the second torque transmission path;
a third gear train disposed in the first torque transmission path, the third gear train configured to receive the torque transmitted thereto from the torque converter;
a first switch mechanism configured to switch between one of the first torque transmission path and the second torque transmission path as a path for transmitting the torque outputted from the electric motor;
a second switch mechanism configured to switch between the first gear train and the third gear train as the path for transmitting the torque after the torque is outputted from the torque converter; and
a controller configured to control the electric motor and to command the operational setting of the first switch mechanism,
wherein the controller is further configured to control the second switch mechanism.

16. The drive unit according to claim 15, wherein the third gear train is further configured to output the torque in a reverse rotational direction to when the torque is outputted from the first gear train.

17. The drive unit according to claim 15, wherein the second switch mechanism is settable to a neutral position in which neither the first gear train nor the third gear train is engaged so as to block transmission of the torque outputted from the torque converter via either the first gear train or the third gear train.

18. A drive unit, comprising:
an electric motor;
a first torque transmission path configured to transmit a torque outputted from the electric motor to an output unit, the first torque transmission path having a torque converter disposed therein that is configured to amplify the torque outputted from the electric motor when the torque is directed in a first rotational direction;
a second torque transmission path provided parallel to the first torque transmission path and having no torque converter disposed therein, the second torque transmission path configured to transmit the torque outputted from the electric motor to the output unit;

a first gear train disposed in the first torque transmission path, the first gear train disposed downstream with respect to the torque converter;
a second gear train disposed in the second torque transmission path;
a first switch mechanism configured to switch between one of the first torque transmission path and the second torque transmission path as a path for transmitting the torque outputted from the electric motor; and
a clutch,
wherein the torque converter includes an input part and an output part, the input part configured to receive the torque inputted thereto after the torque is outputted from the electric motor, the output part configured to receive the torque transmitted thereto from the input part through a fluid,
the clutch is configured and disposed to allow and block transmission of the torque between the input part and the output part, and
the clutch is a one-way clutch configured to allow transmission of the torque outputted from the electric motor when the torque is directed in a second rotational direction and block transmission of the torque outputted from the electric motor when the torque is directed in the first rotational direction.

19. A drive unit, comprising:
an electric motor;
a first torque transmission path configured to transmit a torque outputted from the electric motor to an output unit, the first torque transmission path having a torque converter disposed therein that is configured to amplify the torque outputted from the electric motor when the torque is directed in a first rotational direction;
a second torque transmission path provided parallel to the first torque transmission path and having no torque converter disposed therein, the second torque transmission path configured to transmit the torque outputted from the electric motor to the output unit;
a first gear train disposed in the first torque transmission path, the first gear train disposed downstream with respect to the torque converter;
a second gear train disposed in the second torque transmission path; and
a first switch mechanism configured to switch between one of the first torque transmission path and the second torque transmission path as a path for transmitting the torque outputted from the electric motor;
wherein the torque converter includes a centrifugal lock-up clutch.

* * * * *